US011395340B2

(12) United States Patent
Liberg et al.

(10) Patent No.: US 11,395,340 B2
(45) Date of Patent: Jul. 19, 2022

(54) ENHANCED NB-IOT CE LEVEL SELECTION

(71) Applicant: Telefonaktiebolaget LM Ericsson (publ), Stockholm (SE)

(72) Inventors: Olof Liberg, Stockholm (SE); Hannes Nordmark, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

(21) Appl. No.: 16/611,366

(22) PCT Filed: May 23, 2018

(86) PCT No.: PCT/SE2018/050524
§ 371 (c)(1),
(2) Date: Nov. 6, 2019

(87) PCT Pub. No.: WO2018/217160
PCT Pub. Date: Nov. 29, 2018

(65) Prior Publication Data
US 2020/0163120 A1      May 21, 2020

Related U.S. Application Data

(60) Provisional application No. 62/510,391, filed on May 24, 2017.

(51) Int. Cl.
| | |
|---|---|
| *H04W 16/26* | (2009.01) |
| *H04W 48/16* | (2009.01) |
| *H04W 74/08* | (2009.01) |
| *H04L 5/00* | (2006.01) |
| *H04W 24/02* | (2009.01) |

(Continued)

(52) U.S. Cl.
CPC ....... *H04W 74/0833* (2013.01); *H04L 5/0053* (2013.01); *H04W 16/26* (2013.01);
(Continued)

(58) Field of Classification Search
CPC ..... H04W 16/26; H04W 24/02; H04W 36/08; H04W 48/12; H04W 48/16; H04W 52/146; H04W 72/042; H04W 74/0833
(Continued)

(56) References Cited

U.S. PATENT DOCUMENTS

2015/0016312 A1   1/2015  Li et al.
2016/0353440 A1*  12/2016  Lee ................... H04W 74/0833
(Continued)

FOREIGN PATENT DOCUMENTS

| WO | 2016 167570 A1 | 10/2016 |
| WO | 2016 204556 A1 | 12/2016 |

(Continued)

OTHER PUBLICATIONS

PCT International Search Report for International application No. PCT/SE2018/050524—dated Sep. 28, 2018.
(Continued)

*Primary Examiner* — Harun Chowdhury
(74) *Attorney, Agent, or Firm* — Baker Botts, LLP

(57) ABSTRACT

In certain embodiments, a method for use in a wireless device that has a received power associated with a coverage extension (CE) level N determined from a plurality of CE levels. The method comprises determining that a first attempt to access a system, which was performed according to CE level N, has failed. The method comprises determining whether the wireless device is permitted to make a second attempt according to CE level N+1. The determination is based at least in part on whether the received power of the wireless device is within an offset of CE level N+1, the offset is associated with the CE level N. The method comprises initiating the second attempt to access the system according to the CE level N+1 in response to a determination that the wireless device is permitted to do so.

14 Claims, 21 Drawing Sheets

(51) Int. Cl.
*H04W 48/12* (2009.01)
*H04W 52/14* (2009.01)
*H04W 52/36* (2009.01)
*H04W 64/00* (2009.01)

(52) U.S. Cl.
CPC ........... *H04W 24/02* (2013.01); *H04W 48/12* (2013.01); *H04W 48/16* (2013.01); *H04W 52/146* (2013.01); *H04W 52/367* (2013.01); *H04W 64/003* (2013.01)

(58) Field of Classification Search
USPC ........................................ 370/252, 280, 329
See application file for complete search history.

(56) References Cited

U.S. PATENT DOCUMENTS

2018/0160346 A1* 6/2018 Lee ....................... H04W 36/08
2018/0279274 A1* 9/2018 Sun ..................... H04W 72/042

FOREIGN PATENT DOCUMENTS

WO   2016 205199 A1   12/2016
WO   2017 030485 A1   2/2017
WO   2017 052144 A1   3/2017

OTHER PUBLICATIONS

PCT Written Opinion of the International Searching Authority for International application No. PCT/SE2018/050524—dated Sep. 28, 2019.
Extended European Search Report issued for Application No. / Patent No. 18805719.4-1205/3635994 PCT/SE2018050524—dated Jan. 22, 2021.
3GPP TSG-RAN WG2 Meeting #96; Reno, USA; Source: CATT; Title: Report of email discussion [95bis#25] [LTE/NB-Iot] RACH on non-anchor (R2-168156)—Nov. 14-18, 2016.
EPO Communication Pursuant To Article 94(3) EPC issued for Application No. 18 805 719.4-1205—dated Sep. 8, 2021.

* cited by examiner

ENHANCED NB-IOT CE LEVEL SELECTION

PRIORITY

This nonprovisional application is a U.S. National Stage Filing under 35 U.S.C. § 371 of International Patent Application Serial No. PCT/SE2018/050524 filed May 23, 2018 and entitled ENHANCED NB-IOT CE LEVEL SELECTION which claims priority to U.S. Provisional Patent Application No. 62/510,391 filed May 24, 2017 both of which are hereby incorporated by reference in their entirety.

TECHNICAL FIELD

Certain embodiments relate, in general, to wireless communications and more particularly to enhanced narrow-band Internet of Things (NB-IoT) coverage extension (CE) level selection.

BACKGROUND

In Release 13, the third generation partnership project (3GPP) developed NB-IoT. This new radio access technology is dedicated to providing connectivity to services and applications demanding qualities such as reliable indoor coverage and high capacity in combination with low device complexity and power consumption.

In Release 14, 3GPP expanded the NB-IoT platform to provide positioning services, as well as support for multicast, and device output power as low as 14 dBm to cater for even lower device complexity. Also, incremental improvements such as support for system access on non-anchor carriers and improved uplink (UL) and downlink (DL) throughput are specified.

Narrow Band Physical Random Access Channel (NPRACH) Transmission

In NB-IoT, the random access (RA) procedure provides the means of synchronization to the uplink frame structure. A device, such as a user equipment (UE), initiates the RA procedure after synchronizing to the downlink frame structure. In the first step of the RA process, the UE transmits a Narrow Band Random Access Channel (NPRACH) preamble. In the second step, the enhanced Node B (eNB) detects the preamble time of arrival (TA) and signals the TA value to the UE. The UE will thereafter use the TA value to align its transmission to the UL frame structure.

NB-IoT uses repeated transmissions to extend its coverage compared to earlier supported 3GPP radio access technologies. When accessing the system, a UE may repeat the preamble transmission, for example, up to 128 times to achieve coverage in the most demanding situations. To support a range of repetition levels the NB-IoT radio interface has been designed with three separate NPRACH radio resources, each associated with a coverage range and a set of repetitions.

FIG. 1 illustrates a typical NPRACH configuration. The example in the illustration shows three NPRACH resources, and each NPRACH resource is associated with a Coverage Extension (CE) level (e.g., level 0 (CE0), 1 (CE1) and 2 (CE2)). A CE level is furthermore associated with a set of repetitions of the random access preamble. The number of repetitions increases with the increase in coverage intended to be supported by the NPRACH resource.

To select a NPRACH resource, the UE measures the downlink received power and, based on this and a set of broadcasted signal level thresholds, makes a selection of the NPRACH resource to use for its system access, i.e., the number of times the random access preamble transmission should be repeated.

Assuming that the eNB uses a transmit power of 43 dBm over 180 kHz, then the power per 15 kHz sub-carrier is ~32 dBm. If CE1 starts at a coupling loss of 144 dB and CE2 at a coupling loss of 154 dB, then the Narrowband Reference Signal Received Power (NRSRP) thresholds ($P_{CE,Th,1}$ and $P_{CE,Th,2}$) may be associated with NRSRP levels of 32-144=-112 dBm and 32-154=-122 dBm, as illustrated in FIG. 2.

A UE expects the base station to respond to the random access preamble with a Random Access Response (RAR). In case the UE does not detect a RAR, the UE may reattempt the first access attempt in its chosen CE level up to 10 times. If it has still not received the RAR, it should go to the next CE level and increase the number of preamble repetitions in accordance to the configuration in the new CE level. This mechanism ensures that a UE that starts with a CE level that is too low will end up in its correct CE level from which it should be able to access the system.

NPRACH Power Control

When a UE accesses the system using the first CE level 0, the UE is mandated to use power control and meet a received power level target at the eNB (taking the UE's estimated path loss into account). For CE levels 1 and 2, the UE is mandated to use repetitions in combination with its maximum configurable power $P_{CMAX,c}$, which is limited by the allowed power in the cell. In 3GPP Technical Specification (TS) 36.213 this procedure is specified as follows:

"For the lowest configured repetition level, a narrowband preamble transmission power $P_{NPRACH}$ is determined as $P_{NPRACH}=\min\{P_{CMAX,c}(i), \text{NARROWBAND\_PREAMBLE\_RECEIVED\_TARGET\_POWER}+PL_c\}$_ [dBm]

where $P_{CMAX,c}(i)$ is the configured UE transmit power for narrowband IoT transmission defined in [6] for subframe i of serving cell c and $PL_c$ is the downlink path loss estimate calculated in the UE for serving cell c. For a repetition level other than the lowest configured repetition level, $P_{NPRACH}$ is set to $P_{CMAX,c}(i)$."

$P_{CMAX,c}$ is upper bounded by $P_{CMAX\_H,c}$ which is defined as MIN $\{P_{EMAX,c}, P_{PowerClass}\}$ (see 3GPP TS 36.101). Here $P_{EMAX,c}$ is the maximum allowed power in the serving cell which is signaled to the UE using the P-max information element (IE) in system information block.

The NARROWBAND_PREAMBLE_RECEIVED_TARGET_POWER is configured by the network using the preambleInitialReceivedTargetPower IE. A value between -90 and -120 dBm can be configured for NB-IoT.

As an example, assume that the device uses 23 dBm power and the preambleInitialReceivedTargetPower is configured to -116 dBm. Then a UE experiencing a coupling loss less than (23)-(-116)=139 dB will down regulate the uplink power. A UE experiencing a coupling loss above 139 dB will use its maximum configurable power to come as close to the targeted power level as possible. FIG. 3 illustrates the relationship between CE level selection and NPRACH power configuration.

SUMMARY

Certain problems can occur when a UE in good coverage with a low coupling loss to the base station fails to access the system in CE level 0 due to high level of uplink interference. The UE will then move to CE level 1 and reattempt to access using full power and an increased number of repetitions. The combination of using full power over a long preamble transmission at a low coupling loss may lead to an extended blocking scenario, where the UE transmission desensitizes the BS receiver. Certain proposals to address the extended blocking scenario involve controlling and thereby lowering the UE transmit power when moving to from CE level 0 to CE level 1. However, the present disclosure recognizes that lowering the UE power will also lower the likelihood of the UE being able to access the system. Certain embodiments of the present disclosure provide solutions to this and other problems.

According to certain embodiments, a method for use in a wireless device that has a received power associated with a coverage extension (CE) level N determined from a plurality of CE levels. The method comprises determining that a first attempt to access a system, which was performed according to CE level N, has failed. The method comprises determining whether the wireless device is permitted to make a second attempt according to CE level N+1. The determination is based at least in part on whether the received power of the wireless device is within an offset of CE level N+1, the offset is associated with the CE level N. The method comprises initiating the second attempt to access the system according to the CE level N+1 in response to a determination that the wireless device is permitted to do so.

According to certain embodiments, a wireless device comprise processing circuitry operable to determine that a first attempt to access a system has failed. The first attempt was performed according to a CE level N determined from a plurality of CE levels based on a received power of the wireless device. The processing circuitry is configured to determine whether the wireless device is permitted to make a second attempt according to CE level N+1. The determination is based at least in part on whether the received power of the wireless device is within an offset of CE level N+1, the offset is associated with the CE level N. The processing circuitry is configured to initiate the second attempt to access the system according to the CE level N+1 in response to a determination that the wireless device is permitted to do so.

According to certain embodiments, a computer program product comprises a non transitory computer readable medium storing computer readable program code. The computer readable program code comprises program code for determining that a first attempt to access a system has failed. The first attempt is performed according to a CE level N that is determined from a plurality of CE levels based on a received power of the wireless device. The computer readable program code comprises program code for determining whether the wireless device is permitted to make a second attempt according to CE level N+1. The determining is based at least in part on whether the received power of the wireless device is within an offset of CE level N+1, the offset associated with the CE level N. The computer readable program code further comprises program code for initiating the second attempt to access the system according to the CE level N+1 in response to a determination that the wireless device is permitted to do so.

Each of the above-described method in the wireless device, wireless device, and/or computer program product may include one or more additional features, examples of which are as follows.

In certain embodiments, a number of repetitions permitted for an access attempt according to CE level N is fewer than a number of repetitions permitted for an access attempt according to CE level N+1.

In certain embodiments, a maximum transmission power permitted for an access attempt according to CE level N is less than a maximum transmission power permitted for an access attempt according to CE level N+1.

In certain embodiments, determining whether the wireless device is permitted to make the second attempt according to CE level N+1 is based at least in part on a rule that applies to one or more categories of wireless devices, and the wireless device corresponds to at least one of the categories. Examples of categories include NB IoT Cat N1, NB IoT Cat N2, LTE coverage enhanced Cat M1, and/or LTE coverage enhanced Cat M2.

In certain embodiments, the received power of the wireless device is associated with the CE level N when the received power of the wireless device is greater than a first threshold X(N) and less than a second threshold Y(N). The first threshold X(N) corresponds to a minimum received power associated with the CE level N, and the second threshold Y(N) corresponds to a maximum received power associated with the CE level N.

In certain embodiments, the first threshold X(N) defines a boundary between CE level N and CE level N+1. In certain embodiments, the received power of the wireless device is within the offset associated with the CE level N when the received power of the wireless device is less than the first threshold X(N) plus an offset value associated with the CE level N. Some embodiments configure to offset value to define an offset threshold corresponding to a received power that is between the first threshold X(N) and the second threshold Y(N). In other embodiments, the offset value can be set to a maximum value such that the wireless device is permitted to attempt to access the system from the CE level N+1 whenever the attempt to access the system from the CE level N fails.

In certain embodiments, the offset value is received in RRC signaling from a network node. In certain embodiments, the offset value is one of a plurality of offset values, each offset value associated with a respective CE level.

In certain embodiments, the method prohibits the wireless device from making the second access attempt according to the CE level N+1 in response to a determination that the received power of the wireless device is within CE level N but not within the offset of CE level N+1, the offset associated with CE level N.

In certain embodiments, a number of first attempts are fewer when the received power is within the offset as compared to when the received power is not within the offset.

In certain embodiments, the wireless device performs one or more first attempts before initiating the second attempt to access the system according to the CE level N+1 in response to a determination that the wireless device is permitted to do so.

In certain embodiments, the CE level N corresponds to a first NPRACH coverage extension level, the CE level N+1 corresponds to a second NPRACH coverage extension level, and the received power comprises an NRSPR of the wireless device.

According to certain embodiments, a method for use in a network node comprises determining information related to whether a wireless device is permitted to make a second attempt to access the network node from a coverage extension (CE) level N+1 after failing a first attempt to access the network node from a CE level N. The method further comprises communicating the information to the wireless device.

According to certain embodiments, a network node comprises processing circuitry configured to determine information related to whether a wireless device is permitted to make a second attempt to access the network node from a coverage extension (CE) level N+1 after failing a first attempt to access the network node from a CE level N. The processing circuitry is further configured to communicate the information to the wireless device.

According to certain embodiments, a computer program product comprises a non-transitory computer readable medium storing computer readable program code. The computer readable program code comprises program code for determining information related to whether a wireless device is permitted to make a second attempt to access the network node from a coverage extension (CE) level N+1 after failing a first attempt to access the network node from a CE level N. The computer readable program code comprises program code for communicating the information to the wireless device.

Each of the above-described method in the network node, network node, and/or computer program product may include one or more additional features, examples of which are as follows.

In certain embodiments, a number of repetitions permitted for an access attempt according to CE level N is fewer than a number of repetitions permitted for an access attempt according to CE level N+1.

In certain embodiments, a maximum transmission power permitted for an access attempt according to CE level N is less than a maximum transmission power permitted for an access attempt according to CE level N+1.

In certain embodiments, the information comprises a rule that allows reselection of the CE level N+1 due to an incorrect choice of the CE level N, while preventing reselection of the CE level N+1 due to high uplink interference level.

In certain embodiments, the information comprises a rule indicating one or more categories of wireless devices to which the rule applies. Examples of categories include NB IoT Cat N1, NB IoT Cat N2, LTE coverage enhanced Cat M1, and/or LTE coverage enhanced Cat M2.

In certain embodiments, the information comprises one or more offset values. Each offset value is associated with a respective CE level. At least one of the offset values is associated with CE level N and enables the wireless device to determine whether a received power of the wireless device is within an offset of CE level N+1. In certain embodiments, the offset value associated with CE level N is greater than zero. In certain embodiments, the offset value associated with CE level N is a maximum value indicating that the wireless device is permitted to attempt to access the system from the CE level N+1 whenever the attempt to access the system from the CE level N fails.

In certain embodiments, the information prohibits the wireless device from making the second access attempt according to the CE level N+1 if the received power of the wireless device is within CE level N but not within the offset of CE level N+1, the offset associated with CE level N.

In certain embodiments, the information indicates that a number of first attempts is fewer when the received power is within the offset as compared to when the received power is not within the offset.

In certain embodiments, the information indicates a number of first attempts that the wireless device is to perform according to CE level N before determining whether the wireless device is permitted to make the second attempt to access the network node from CE level N+1.

In certain embodiments, the information is communicated in RRC signaling to the wireless device.

In certain embodiments, the CE level N correspond to a first NPRACH coverage extension level and the CE level N+1 corresponds to a second NPRACH coverage extension level.

Certain embodiments of the present disclosure update the rules for moving to NPRACH CE level N+1 when failing to access in the system from NPRACH CE level N. For example, certain embodiments of the present disclosure introduce a new offset, $P_{CE,Offset}$, and reserve the right to select a new NPRACH CE level N+1 to UEs that experience an NRSRP between $P_{CE,Th,N}$ and $P_{CE,Th,N}+P_{CE,Offset}$.

Certain embodiments of the present disclosure may provide one or more technical advantages. An advantage of certain embodiments is that UEs that have erroneously selected NPRACH CE level N due to impaired NRSRP measurements are allowed to reselect to a new NPRACH CE level N+1, while preventing UEs from selecting a next NPRACH CE level N+1 due to high interference levels. This will mitigate the risk of blocking the base station described when attempting access in high interference conditions. Certain embodiments may have all, some, or none of these advantages. Advantages of other embodiments may be apparent to those of ordinary skill in the art.

BRIEF DESCRIPTION

FIGS. 10A, 10B, 14, and 15 are flow diagrams illustrating examples of methods performed by a wireless device, in accordance with certain embodiments.

Figure 11A:
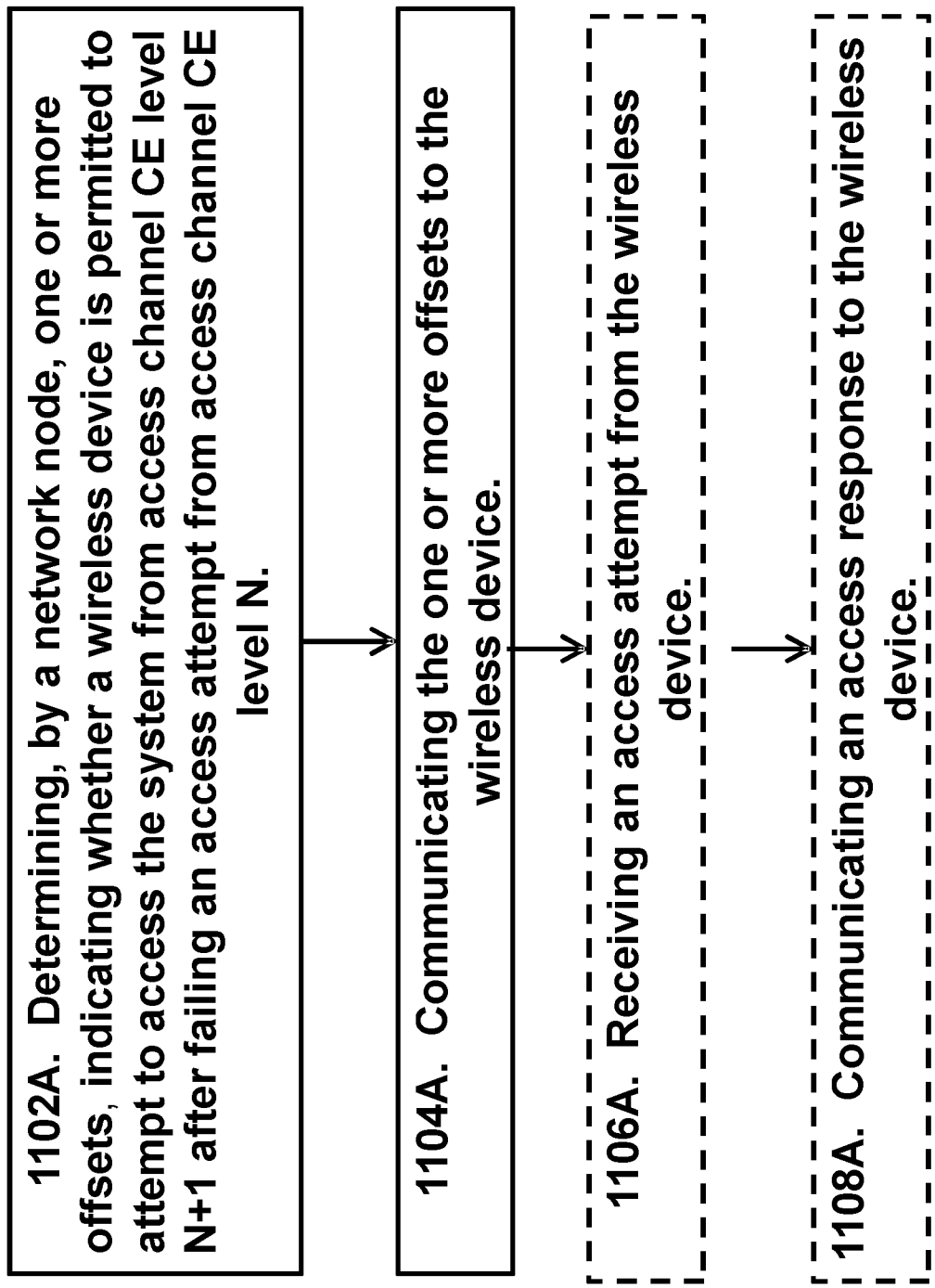
Figure 11B:
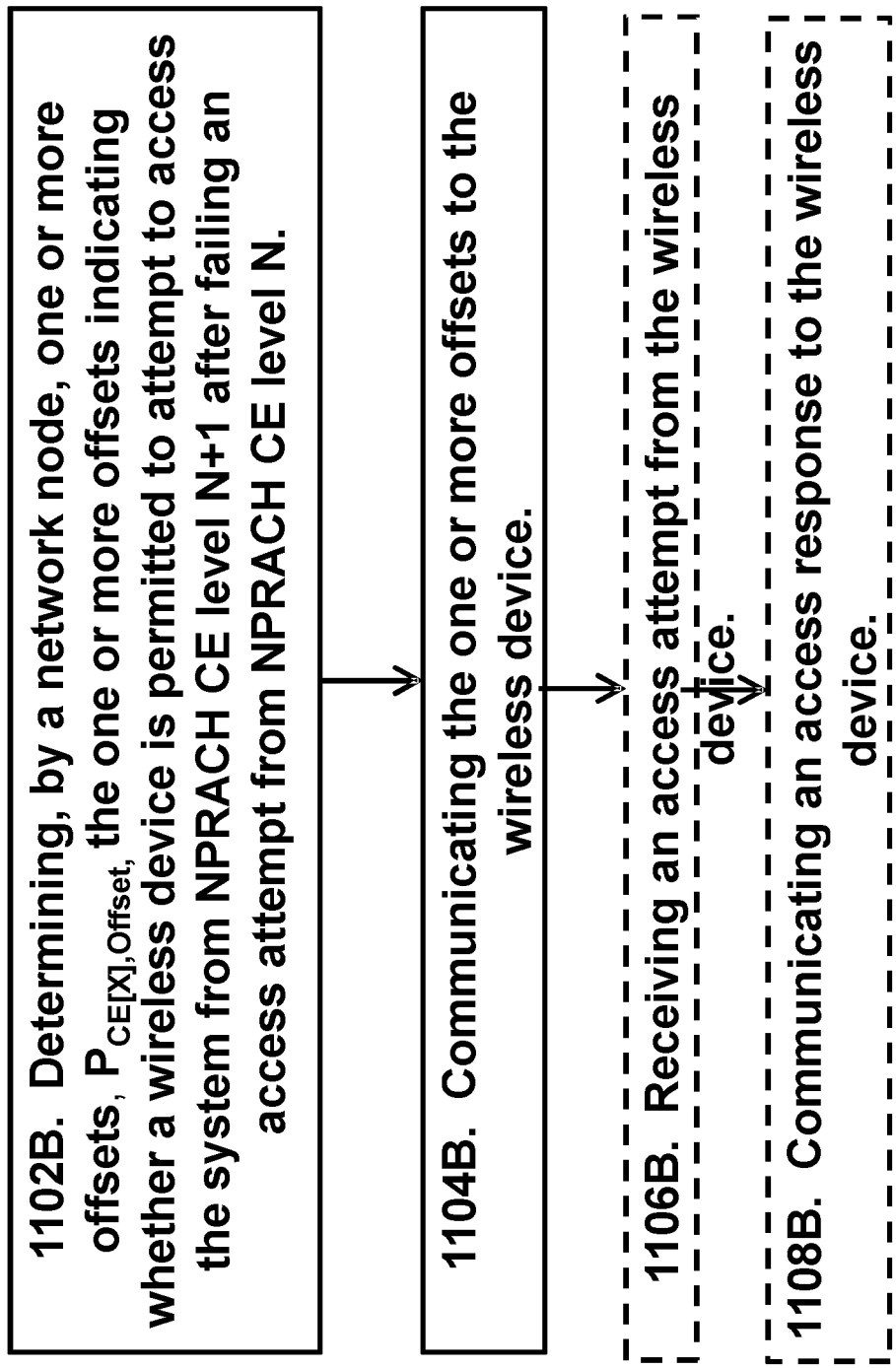
Figure 16:
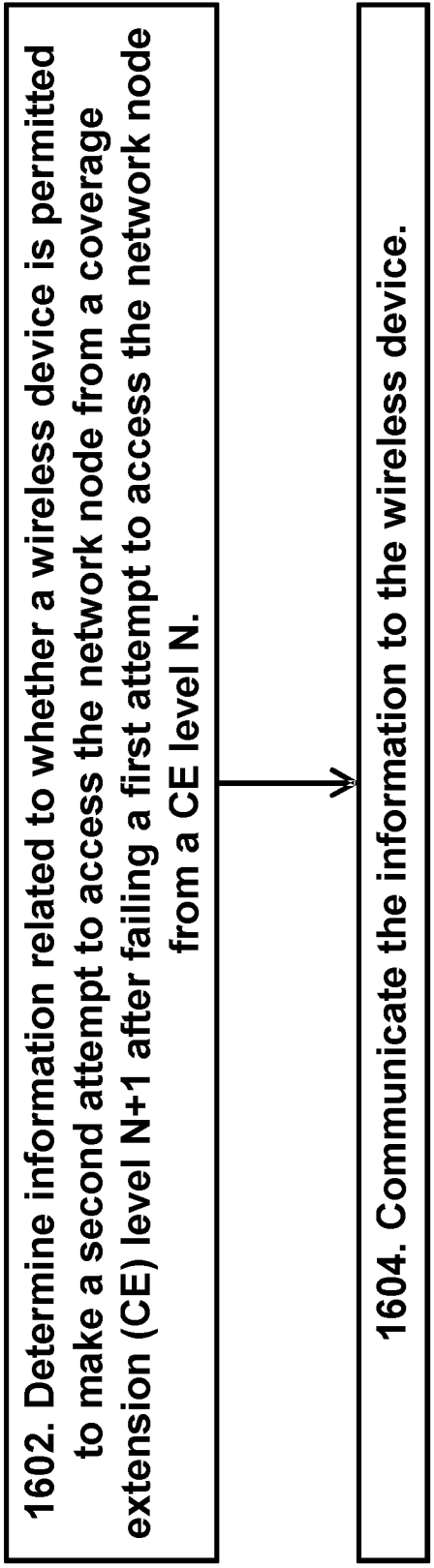

FIGS. 11A, 11B, and 16 are flow diagrams illustrating examples of methods performed by a network node, in accordance with certain embodiments.

FIGS. 12A, 12B, 13A, and 13B are signal diagrams illustrating examples of signal flows between a wireless device and a network node, in accordance with certain embodiments.

DETAILED DESCRIPTION

In a first embodiment a new offset $P_{CE,Offset}$ is introduced in the 3GPP specifications. The offset reserves the right to select a new NPRACH CE level N+1 to UEs that experience an NRSRP between $P_{CE,Th,N}$ and $P_{CE,Th,N}+P_{CE,Offset}$.

Figure 4A:
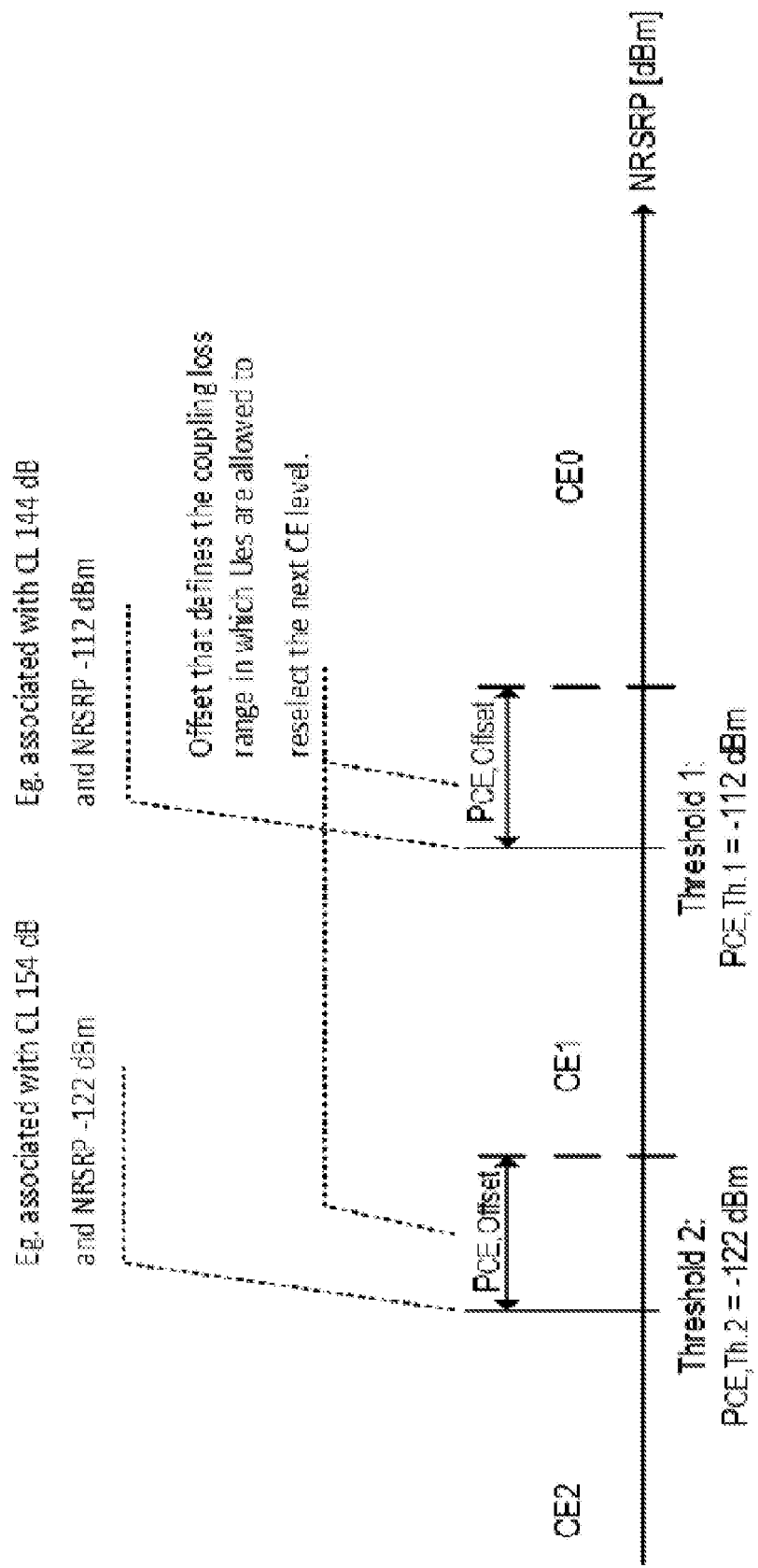
FIGS. 4A and 4B illustrate examples of offsets that may be used in CE level selection, in accordance with certain embodiments.

FIG. 4A illustrates an example of offset $P_{CE,Offset}$. The offset $P_{CE,Offset}$ can be set to any suitable value including 0 (which prevents any UEs to select a new CE level) and a maximum value such as infinity (which allows all UEs to select a new CE level). For purposes of example, suppose that the value of $P_{CE,Offset}$ is set to 2 dB. Suppose that a first UE, UE A, is currently in the CE level 0 and that the threshold for CE level 0 is $P_{CE,Th.1}$ is −112 dBm. Based on the example $P_{CE,Offset}$ of 2 dB, the right to move from CE level 0 to CE level 1 would be reserved to UEs experiencing an NRSRP between −110 dBm and −112 dBm. Thus, if UE A were experiencing an NRSRP of −111 dBm, UE A could move from CE level 0 to CE level 1 if UE A had failed to receive the RAR in response to a pre-determined number of access attempts in CE 0. However, if UE A were experiencing an NRSRP of −102 dBm, the rules could be configured to prohibit UE A from moving from CE level 0 to CE level 1.

Similarly, suppose that a second UE, UE B, is currently in the CE level 1 and that the threshold for CE level 1 is $P_{CE,Th.2}$ is −122 dBm. Based on the example $P_{CE,Offset}$ of 2 dB, the right to move from CE level 1 to CE level 2 would be reserved to UEs experiencing an NRSRP between −120 dBm and −122 dBm. Thus, if UE B were experiencing an NRSRP of −121 dBm, UE B could move from CE level 1 to CE level 2 if UE B had failed to receive the RAR in response to a pre-determined number of access attempts in CE 1. However, if UE B were experiencing an NRSRP of −114 dBm, the rules could be configured to prohibit UE B from moving from CE level 1 to CE level 2.

Although the previous example described using the same offset relative to $P_{CE,Th.1}$ and $P_{CE,Th.2}$, other embodiments could use different offsets. For example, $P_{CE,Th.1}$ could have an associated offset $P_{CE(1),Offset}$, and $P_{CE,Th.2}$ could have an associated offset $P_{CE(2),Offset}$ (stated more generally, $P_{CE,Th.X}$ could have an associated offset $P_{CE(X),Offset}$). The value of $P_{CE(1),Offset}$ could be the same as or different than the value of $P_{CE(2),Offset}$. As one example, suppose the value of $P_{CE(1),Offset}$ was set to 2 dB. The value of $P_{CE(2),Offset}$ could be less than, equal to, or greater than the value of $P_{CE(1),Offset}$. Continuing with the previous example, $P_{CE(2),Offset}$ could be 1 dB, 2 dB, 3 dB or other suitable value. Thus, certain embodiments, specify one offset $P_{CE(X),Offset}$ per CE level X.

The offset(s) can be configured in any suitable manner. In certain embodiments, the offset(s) are configured using radio resource control (RRC) signaling.

In certain embodiments, the offset(s) can be configured to apply to certain types of UEs. As an example, in certain embodiments, the offset(s) can be configured to apply to NB-IoT UEs (such as Cat N1 and Cat N2 UEs). For purposes of example and explanation, certain embodiments herein have been described with reference to NB-IoT. These examples are non-limiting, and other embodiments can be implemented in other types of networks. For example, in certain embodiments, the offset(s) can be configured to apply to LTE coverage enhanced UEs (such as Cat M1 and Cat M2 UEs) operating in accordance with the 3GPP LTE specifications. In certain embodiments, the offset(s) can be configured to apply to machine-type-communications (MTC) UEs.

In certain embodiments, the threshold-based techniques described herein can be combined with other techniques, such as the reattempt technique described with respect to NPRACH transmission in the background section. For example, the UE may move from CE level N to CE level N+1 if it fulfills the RSRP criteria described herein (e.g., if the RSRP is between $P_{CE,Th.N+1}$ and $P_{CE,Th.N+1}+P_{CE,Offset}$) AND after having performed X random access attempts in CE level N without receiving a random access response from the eNB. In certain embodiments, the number of random access attempts may be determined using a reattempt counter, for example, using a reattempt counter set forth in a 3GPP specification.

Figure 4B:
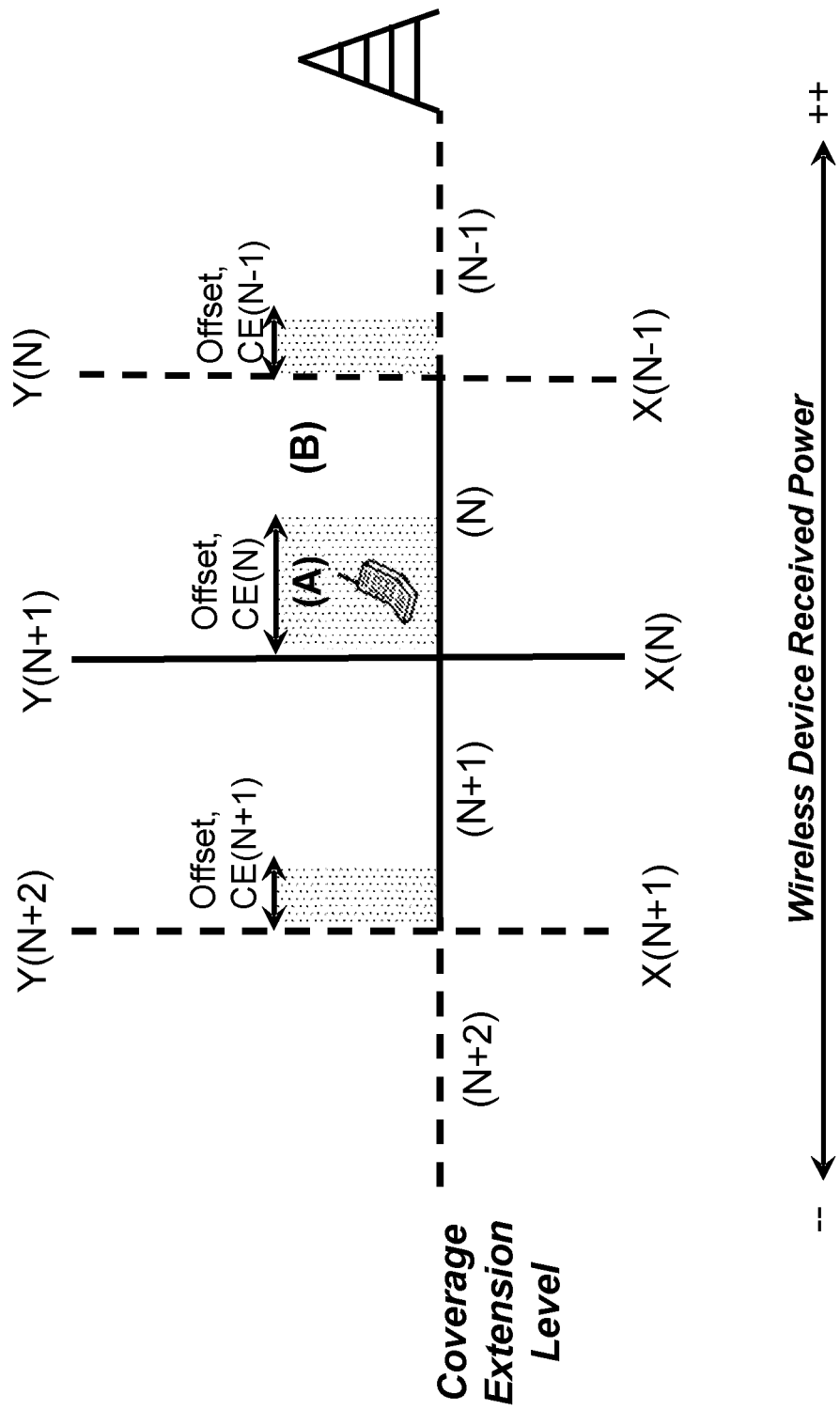

FIG. 4B illustrates an example of a network comprising a plurality of CE levels. For purposes of example, FIG. 4B includes CE levels N−1, N, N+1, and N+2. Other embodiments may include more or fewer CE levels. As an example, certain embodiments may add one or more CE levels before CE level N−1 and/or add one or more CE levels after CE level N+2. As another example, CE level N−1 and/or CE level N+2 may be optional and either or both may be omitted in certain embodiments.

Each CE level is associated with a range of received power values of the wireless device. The CE levels are arranged sequentially such that the first CE level is associated with the strongest received power values and the last CE level is associated with the weakest received power values of the wireless device. In the example of FIG. 4B, the sequence is arranged in the order of CE level N−1, CE level N, CE level N+1, and CE level N+2, with CE level N−1 being associated with the strongest received power values and CE level N+2 being associated with the weakest received power values of the wireless device. In certain embodiments, CE level N may refer to the current CE level of the wireless device based on its current received power value. CE level N+1 may refer to the CE level adjacent to CE level N and may be associated with a weaker range of received power values than CE level N.

In certain embodiments, thresholds may be used to indicate the range of received power values associated with a respective CE level. For example, a given CE level may encompass a range of received power values greater than a first threshold (X) and less than a second threshold (Y). Threshold (X) corresponds to a minimum received power associated with the CE level and threshold (Y) corresponds to a maximum received power associated with the CE level. In certain embodiments, the thresholds (X) and (Y) define a boundary between adjacent CE levels. For example, the minimum threshold X(N) associated with CE level N corresponds to the maximum threshold Y(N+1) associated with adjacent CE level N+1. Similarly, the minimum threshold X(N−1) associated with CE level N−1 corresponds to the maximum threshold Y(N) associated with adjacent CE level N. Thus, adjacent CE levels may encompass adjacent ranges of received power values. Tables 1-2 below provide two different examples of possible received power ranges that may be encompassed by the different CE levels.

TABLE 1

| Received Power (RP) | CE Level |
| --- | --- |
| RP >= X(N − 1) | N − 1 |
| X(N − 1) > RP >= X(N) | N |
| X(N) > RP >= X(N + 1) | N + 1 |
| X(N + 1) > RP | N + 2 |

TABLE 2

| Received Power (RP) | CE Level |
| --- | --- |
| RP > X(N − 1) | N − 1 |
| X(N − 1) >= RP > X(N) | N |
| X(N) >= RP > X(N + 1) | N + 1 |
| X(N + 1) >= RP | N + 2 |

The first CE level is associated with the strongest received power range. In certain embodiments, the maximum received power threshold (Y) of the first CE level may be implicit and may encompass the maximum received power that the wireless device is capable of receiving. The last CE level is associated with the weakest received power range. In certain embodiments, the minimum received power threshold (X) of the last CE level may be implicit and may encompass the minimum received power that the wireless device is capable of receiving. In the example of FIG. 4B, the first CE level corresponds to CE level N−1 and the last CE level corresponds to CE level N+2.

As illustrated in FIG. 4B, the thresholds (X) and (Y) are configured such that the CE levels N−1, N, N+1, and N+2 are associated with non-overlapping ranges of received powers. Although the received power of the wireless device is associated with a single CE level at a time, such as CE level N, the wireless device does not necessarily use the settings associated CE level N. As further discussed below, a wireless device within CE level N may use settings associated with CE level N+1 in certain situations.

The wireless device uses the CE level when making an attempt to access the system. In certain embodiments, the CE level indicates the subcarriers that the wireless device is permitted to use for the attempt, the number of repetitions that the wireless device is permitted to use for the attempt, and/or the maximum transmission power that the wireless device is permitted to use for the attempt. CE levels associated with weaker received power values may be permitted more repetitions or a higher maximum transmission power than CE levels associated with stronger received power values. As an example, the number of repetitions that the wireless device is permitted to use for an access attempt according to CE level N may be fewer than the number of repetitions that the wireless device is permitted to use for an access attempt according to CE level N+1. As another example, the maximum transmission power permitted for an access attempt according to CE level N may be less than a maximum transmission power permitted for an access attempt according to CE level N+1.

Suppose the wireless device performs a first attempt to access the system according to the subcarriers, number of repetitions, and/or maximum transmission power associated with CE level N. If the wireless device fails to receive a timely RAR message in response to the first attempt, the wireless device determines that the first attempt has failed. If the first attempt within CE level N has failed, the wireless device may determine whether it is permitted to perform a second attempt according to the subcarriers, number of repetitions, and/or maximum transmission power associated with CE level N+1. A second attempt is not limited to being an attempt following the first attempt without any other attempts in-between. For example, the wireless device may perform a number of first attempts associated with CE level N, e.g. 10 first attempts, before performing a second attempt. After the one or more first attempts on CE level N the wireless device may perform a second attempt on CE level N+1. In one or more embodiments, the wireless device may perform the second attempt directly after the first attempt e.g. one attempt or one attempt only on CE level N before being permitted to make an attempt on CE level N+1. As another example, the wireless device may perform one or a few, e.g. 2-3, first attempts on CE level N before performing a second attempt on CE level N+1. A number of first attempts may be fewer when the received power is within the offset as compared to when the received power is not within the offset. An advantage of allowing a wireless device to move from CE level N only after a few first attempts is that a wireless device under high interference may resolve the issue more quickly by attempting random access on another CE level sooner. The wireless device uses an offset associated with CE level N to determine whether the received power is within an offset of CE level N+1. For example, if the received power of the wireless device is less than the minimum threshold X(N) plus an offset value (offset(N)) associated with CE level N, the wireless device within CE level N determines that it is within the offset of CE level N+1.

FIG. 4B illustrates an example of received power values associated with CE level N. The received power values include a shaded region labeled "A" showing values within an offset of CE level N+1 and a non-shaded region labeled "B" showing values outside of the offset from CE level N+1. If the received power of the wireless device is within region "A," the wireless device is permitted to perform the second attempt according to CE level N+1. If the received power of the wireless device is within region "B," the wireless device may be prohibited from performing the second attempt according to CE level N+1. In certain embodiments, if the received power of the wireless device is within region "B," the wireless device may perform the second attempt according to CE level N.

The principles discussed with respect to FIG. 4B may be applied with reference to FIG. 4A. As a first example, suppose that the received power of the wireless device is −110 dBm such that CE level N of FIG. 4B corresponds to CE0 of FIG. 4A. Assuming that CE level N corresponds to CE0, then CE level N+1 of FIG. 4B would correspond to CE1 of FIG. 4A. For purposes of the first example, the $P_{CE,Th,1}$ threshold −112 dBm defines the boundary between CE0 and CE1 and corresponds to the minimum received power threshold X(N) associated with CE level N in FIG. 4B. Because CE0 is the first CE level, the capabilities of the wireless device implicitly define the maximum received power threshold Y(N) associated with CE level N in FIG. 4B. Suppose that the $P_{CE(1),Offset}$, offset(N), is set to 3 dB such that the received power values from −109 dBm to −112 dBm are within an offset of CE1. In this example, if the wireless device failed a first attempt to access the system according to CE0, the wireless device within CE0 would be permitted to perform a second attempt according to CE1 if its received power was from −109 dBm to −112 dBm. The wireless device would not be permitted to perform the second attempt according to CE1 if its received power was greater than −109 dBm.

As a second example, suppose that the received power of the wireless device is −121 dBm such that CE level N of FIG. 4B corresponds to CE1 of FIG. 4A. Assuming that CE level N corresponds to CE1, then CE level N+1 of FIG. 4B would correspond to CE2 of FIG. 4A. For purposes of the second example, the $P_{CE,Th,1}$ threshold −122 dBm defines the boundary between CE1 and CE2 and corresponds to the minimum received power threshold X(N) associated with CE level N in FIG. 4B. The threshold −112 dBm defines the boundary between CE1 and CE 0 and corresponds to the maximum received power threshold Y(N) associated with CE level N in FIG. 4B. Suppose that $P_{CE(2),Offset}$, offset(N), is set to 2 dB such that the received power values from −120 dBm to −122 dBm are within an offset of CE2. In this example, if the wireless device failed a first attempt to access the system according to CE1, the wireless device within CE1 would be permitted to perform a second attempt according to CE2 if its received power was from −120 dBm to −122 dBm. The wireless device would not be permitted to perform the second attempt according to CE2 if its received power was greater than −120 dBm.

In certain embodiments, different CE levels can use different offset values. For example, CE0 may be associated with an offset of 3 dB and CE1 may be associated with an offset of 2 dB. In other embodiments, the CE levels can use the same offset values. In the first example above, the offset value (3 dB) was defined so that an offset threshold corresponding to X(N) plus the offset (i.e., −112 dBm+3 dB=−109 dBm) is between the maximum received power threshold Y(N) (i.e., implicit threshold) and minimum received power threshold X(N) (i.e., −112 dBm) associated with CE0. Similarly, in the second example above, the offset value (2 dB) was defined so that an offset threshold corresponding to X(N) plus the offset (i.e., −122 dBm+2 dB=−120 dBm) is between the maximum received power threshold Y(N) (i.e., −112 dBm) and minimum received power threshold X(N) (i.e., −122 dBm) associated with CE1. Thus, both examples provide CE level N with an "A" region (permits second attempt according to CE level N+1) and "B" region (does not permit second attempt according to CE level N+1).

In certain other embodiments, the offset value may be set to a maximum value, such as infinity, indicating that the wireless device in CE level N is permitted to attempt to access the system from the CE level N+1 whenever the attempt to access the system from the CE level N fails.

In certain other embodiments, the offset value may be set to zero, indicating that the wireless device in CE level N is not permitted to attempt to access the system from the CE level N+1 when the attempt to access the system from the CE level N fails.

In certain embodiments, FIG. 4B may comprise a narrowband network in which CE level N corresponds to a first NPRACH CE level, CE level N+1 corresponds to a second NPRACH CE level, and the received power comprises a NRSRP of the wireless device.

In certain embodiments, a rule indicates that the principles described with respect to FIGURE B apply to one or more categories of wireless devices, such as NB-IoT cat N1, NB-IoT Cat N2, LTE coverage enhanced Cat M1, and/or LTE coverage enhanced Cat M2.

Figure 5:
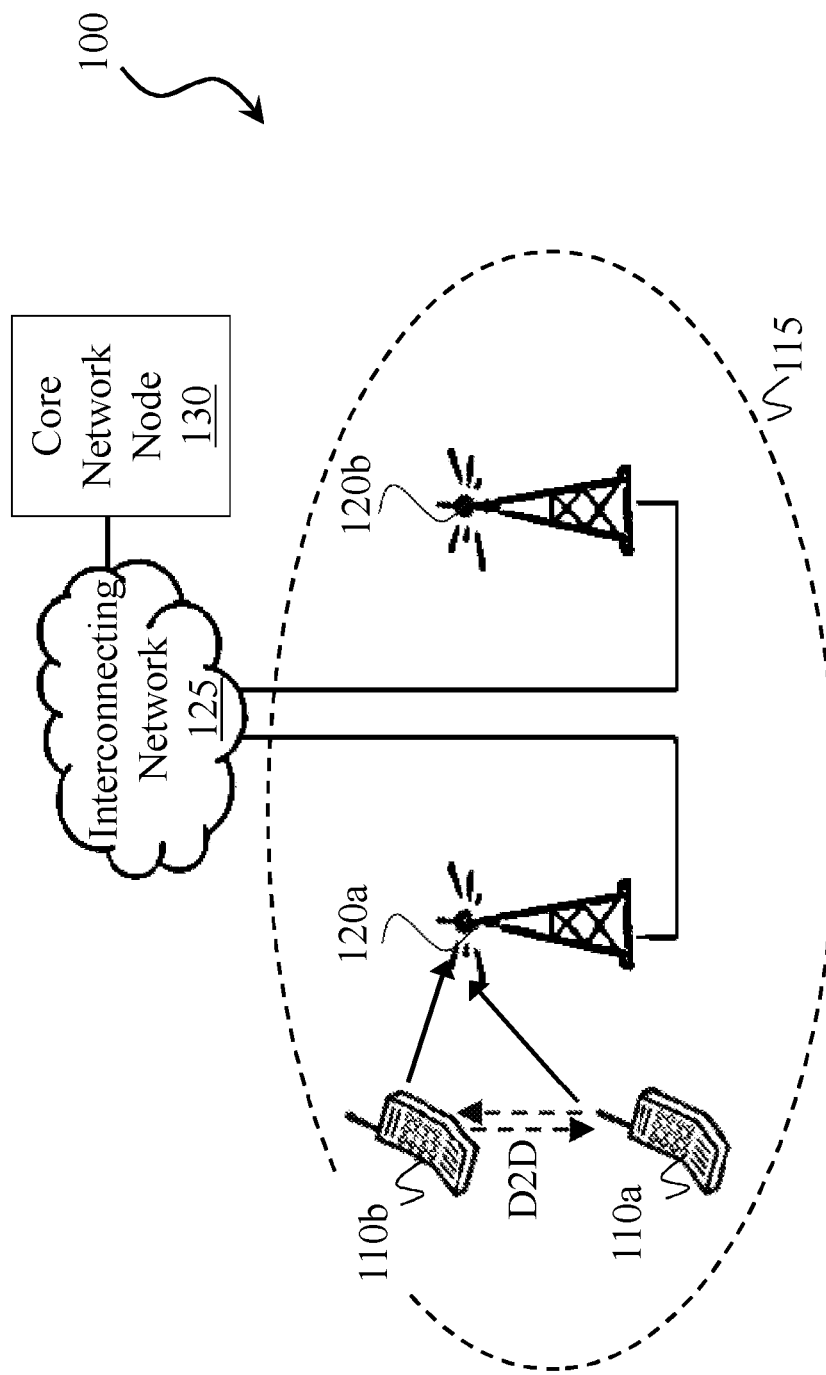
FIG. 5 is a block diagram illustrating an example of a wireless network, in accordance with certain embodiments.

FIG. 5 illustrates an example of a wireless network 100 that may be used for wireless communications. Wireless network 100 includes a plurality of radio nodes. Examples of radio nodes include wireless devices 110a-110b (such as a UE) and radio access nodes 120a-120b (such as a gNB, eNB, or base station). The radio access nodes 120 connect to one or more core network nodes 130 via an interconnecting network 125. Wireless devices 110 within coverage area 115 may each be capable of communicating directly with radio access nodes 120 over a wireless interface. Wireless devices may also be capable of communicating with each other via device-to-device (D2D) communication.

As an example, wireless device 110a may communicate with radio access node 120a over a wireless interface. That is, wireless device 110a may transmit wireless signals and/or receive wireless signals from radio access node 120a. The wireless signals may contain voice traffic, data traffic, control signals, and/or any other suitable information. In some embodiments, an area of wireless signal coverage associated with a radio access node 120 may be referred to as a cell.

In some embodiments wireless device 110 may be interchangeably referred to by the non-limiting term user equipment (UE). Wireless device 110 refers to any type of wireless device communicating with a network node and/or with another UE in a cellular or mobile communication system. Examples of UE are target device, device to device (D2D) UE, V2x UE, machine type UE or UE capable of machine to machine (M2M) communication, PDA, PAD, Tablet, mobile terminals, smart phone, laptop embedded equipped (LEE), laptop mounted equipment (LME), USB dongles, etc. Thus, although FIG. 5 illustrates wireless devices 110 as phones, other embodiments may use other types of wireless devices 110 (including, e.g., NB-IoT UEs, such as Cat N1 and Cat N2 UEs, and/or LTE coverage enhanced UEs, such as Cat M1 and Cat M2 UEs. Example embodiments of wireless device 110 are described in more detail below with respect to FIGS. 6-7.

In some embodiments radio access node 120 may be interchangeably referred to by the non-limiting terms gNB, eNB, base station, network node, or WAN node. The WAN node can be a UE (e.g. D2D UE) or a network node (e.g., access point, base station, cellular node, etc.). Example embodiments of radio access node 120 are described in more detail below with respect to FIGS. 8-9.

In certain embodiments, radio access nodes 120 may interface with a radio network controller. The radio network controller may control radio access nodes 120 and may provide certain radio resource management functions, mobility management functions, and/or other suitable functions. In certain embodiments, the functions of the radio network controller may be included in radio access node 120. The radio network controller may interface with a core network node 130. In certain embodiments, the radio network controller may interface with the core network node 130 via an interconnecting network 125.

The interconnecting network 125 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 may manage the establishment of communication sessions and various other functionalities for wireless devices 110. Wireless devices 110 may exchange certain signals with the core network node using the non-access stratum layer. In non-access stratum signaling, signals between wireless devices 110 and the core network node 130 may be transparently passed through the radio access network. In certain embodiments, radio access nodes 120 may interface with one or more network nodes over an internode interface. For example, radio access nodes 120a and 120b may interface over an X2 interface.

Although FIG. 5 illustrates a particular arrangement of network 100, the present disclosure contemplates that the various embodiments described herein may be applied to a variety of networks having any suitable configuration. For example, network 100 may include any suitable number of wireless devices 110 and radio access nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While the embodiments are described for LTE, the embodiments are applicable to any RAT, such as 5G, NR, LTE FDD/TDD, WCDMA/HSPA, GSM/GERAN, Wi Fi, WLAN, CDMA2000, etc., including adaptations of these RATs for operation under any regulatory domain, licensed or unlicensed.

Figure 6:
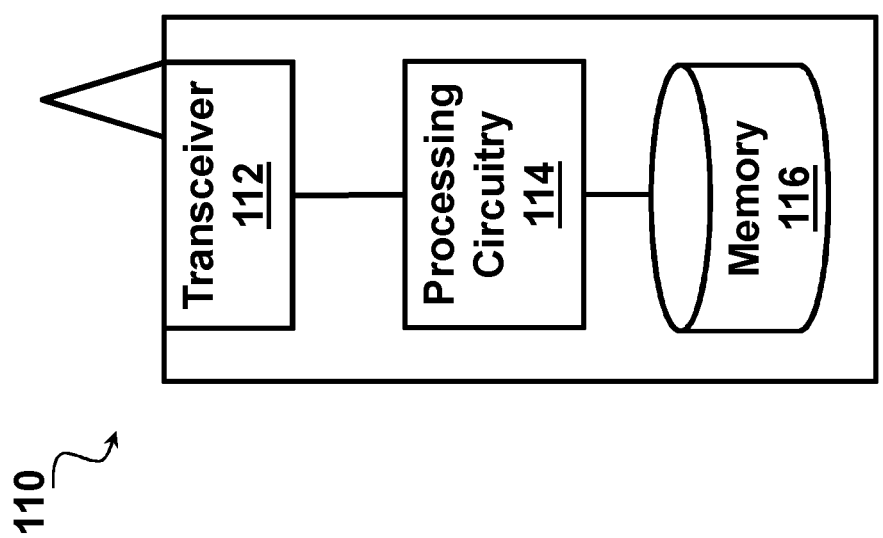
FIG. 6 is a block diagram illustrating an example of a wireless device, in accordance with certain embodiments.

FIG. 6 is a block diagram of an exemplary wireless device 110, in accordance with certain embodiments. Wireless device 110 includes a transceiver 112, processing circuitry 114 (e.g., comprising one or more processors), and memory 116. In some embodiments, transceiver 112 facilitates transmitting wireless signals to and receiving wireless signals from network node/WAN node/radio access node 120 (e.g., via an antenna), processing circuitry 114 executes instructions to provide some or all of the functionality described herein as being provided by a wireless device (or UE), and memory 116 stores the instructions executed by processing circuitry 114.

Processing circuitry 114 may include any suitable combination of hardware and software implemented in one or more modules to execute instructions and manipulate data to perform some or all of the described functions of wireless device 110, such as the function of determining an NPRACH CE level, including any of the functionality described herein as being performed by a wireless device/UE (see e.g., FIGS. 4A, 4B, 10A, 10B, 12A, 12B, 13A, 13B, 14, 15 and the wireless device examples discussed below). In some embodiments, processing circuitry 114 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processor may comprise one or more of the modules discussed with respect to FIG. 7.

Memory 116 is generally operable to store instructions, such as a computer program, software, an application including one or more of logic, rules, algorithms, code, tables, etc. and/or other instructions capable of being executed by a processor. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 114 of wireless device 110.

Other embodiments of wireless device 110 may include additional components beyond those shown in FIG. 6 that may be responsible for providing certain aspects of the wireless device's functionality, including any of the functionality described herein and/or any additional functionality (including any functionality necessary to support the solution described herein). As just one example, wireless device 110 may include input devices and circuits, output devices, and one or more synchronization units or circuits, which may be part of the processing circuitry. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
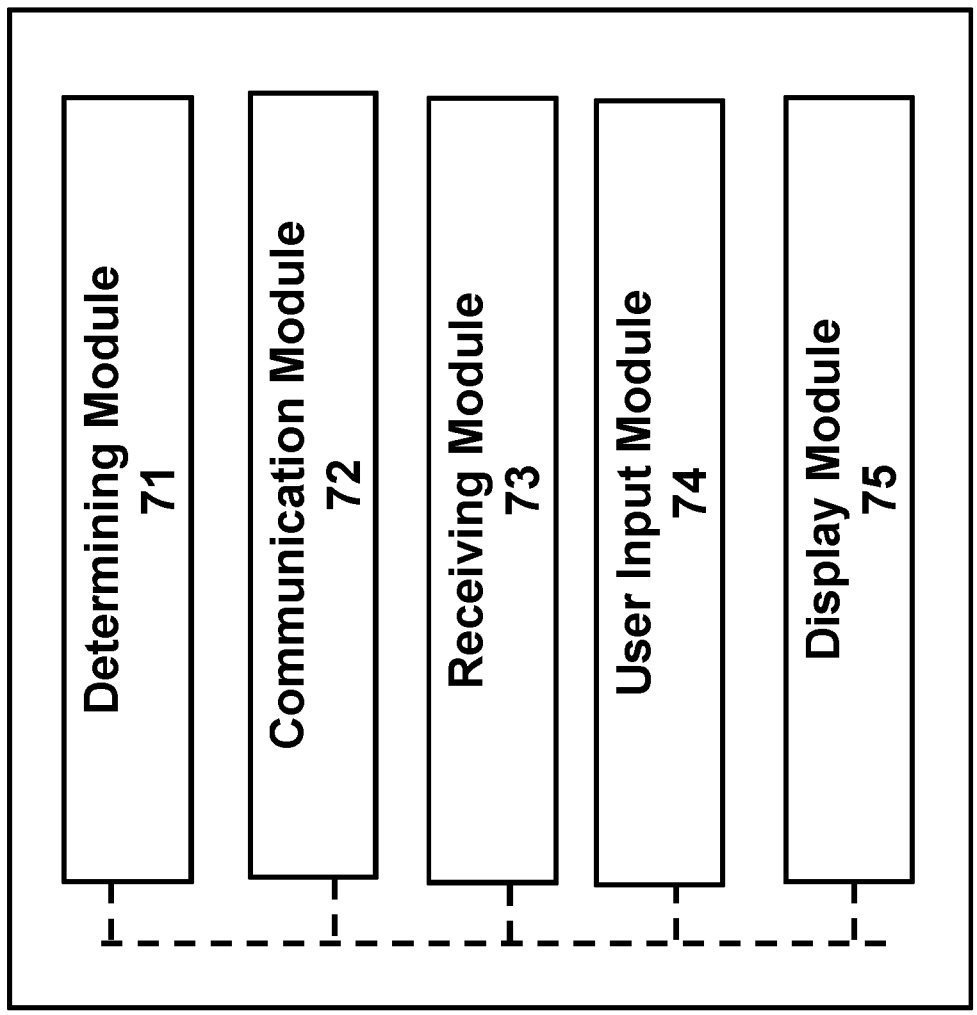
FIG. 7 is a block diagram illustrating an example of modules of a wireless device, in accordance with certain embodiments.

FIG. 7 illustrates examples of modules that can be included in wireless device 110. In certain embodiments, wireless device 110 may include any one or more of determining module(s) 71, communication module(s) 72, receiving module(s) 73, user input module(s) 74, display module(s) 75, and/or other suitable modules. The functionality of the modules may be integrated in a single component or separated among several components in any suitable manner. In certain embodiments, one or more of the modules may be implemented using processing circuitry 114 described with respect to FIG. 6.

The determining module 71 may perform the processing functions of wireless device 110 (including any of the UE functionality to support the above-described embodiments). As one example, the determining module 71 may select an NPRACH CE level. The NPRACH CE level may be selected according to any of the techniques described herein. For example, certain embodiments of the determining module 71 may select the NPRACH CE level using the techniques described with respect to FIGS. 4A, 4B, 10A, 10B, 12A, 12B, 13A, 13B, 14, 15, and/or the other examples wireless device examples below.

The determining module 71 may include or be included in one or more processors, such as processing circuitry 114 described above in relation to FIG. 6. The determining module 71 may include analog and/or digital circuitry configured to perform any of the functions of the determining module 71 and/or processing circuitry described above. The functions of the determining module 71 described above may, in certain embodiments, be performed in one or more distinct modules.

The communication module 72 may perform the transmission functions of wireless device 110. For example, in certain embodiments the communication module 72 may communicate NPRACH preambles according to the selected NPRACH CE level. The communication module 72 may include a transmitter and/or a transceiver, such as transceiver 112 described above in relation to FIG. 6. The communication module 72 may include circuitry configured to wirelessly transmit messages and/or signals. In particular embodiments, the communication module 72 may receive messages and/or signals for transmission from the determining module 71. In certain embodiments, the functions of the communication module 72 described above may be performed in one or more distinct modules.

The receiving module 73 may perform the receiving functions of wireless device 110. For example, the receiving module 73 may receive information from a network node. The information could include information that determining module 71 uses to select the NPRACH CE level, such as narrowband reference signals, one or more rules, and/or one or more offsets (e.g., $P_{CE[X],Offset}$). The receiving module 73 may include a receiver and/or a transceiver, such as transceiver 112 described above in relation to FIG. 6. The receiving module 73 may include circuitry configured to wirelessly receive messages and/or signals. In certain embodiments, the receiving module 73 may include circuitry configured to receive information from memory 116 of wireless device 110. In particular embodiments, the receiving module 73 may communicate received messages and/or signals to the determining module 71. The functions of the receiving module 73 described above may, in certain embodiments, be performed in one or more distinct modules.

In certain embodiments, wireless device 110 may optionally include a user input module 74 that may receive user input intended for wireless device 110. For example, the user input module 74 may receive key presses, button presses, touches, swipes, audio signals, video signals, and/or any other appropriate signals. The user input module 74 may include one or more keys, buttons, levers, switches, touchscreens, microphones, and/or cameras. The user input module 74 may communicate received signals to the determining module 71. The functions of the user input module 74 described above may, in certain embodiments, be performed in one or more distinct modules.

In certain embodiments, wireless device 110 may optionally include a user input module 75, which may present signals on a display of wireless device 110. The user input module 75 may include the display and/or any appropriate circuitry and hardware configured to present signals on the display. The user input module 75 may receive signals to present on the display from the determining module 71. The functions of the user input module 75 described above may, in certain embodiments, be performed in one or more distinct modules.

Each module depicted in FIG. 7 may include any suitable configuration of hardware and/or software. Wireless device 110 may include additional modules beyond those shown in FIG. 7 that may be responsible for providing any suitable functionality, including any of the functionality described above and/or any additional functionality (including any functionality necessary to support the various solutions described herein).

In certain embodiments, some or all of the modules shown in FIG. 7 can be combined with one or more modules shown in FIG. 6. As an example, certain embodiments may combine at least some of the functionality of the processing circuitry (FIG. 6) with the determining module 71 (FIG. 7). As another example, certain embodiments may combine at least some of the functionality of the transceiver (FIG. 6) with the communication and/or receiving modules 73 (FIG. 7).

Figure 8:
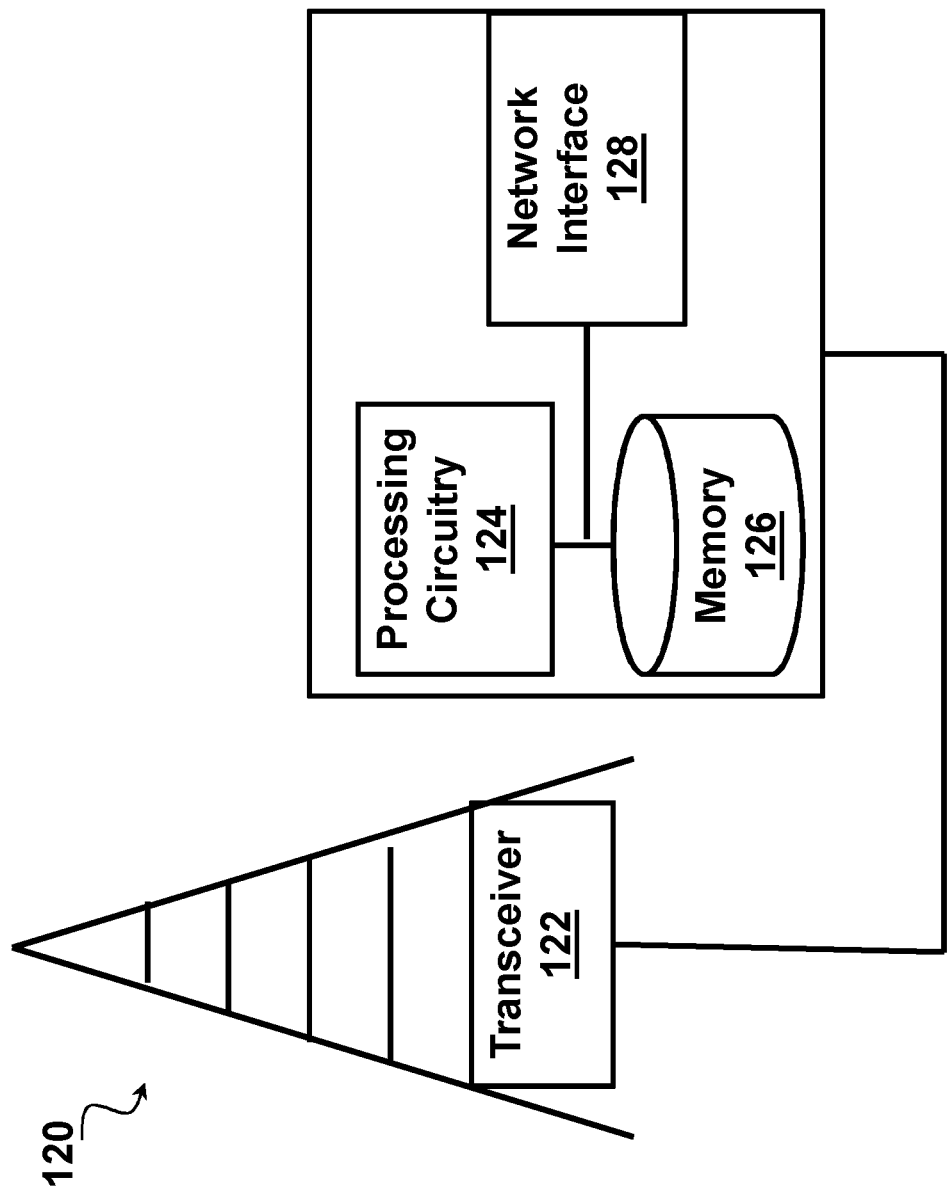
FIG. 8 is a block diagram illustrating an example of a network node, in accordance with certain embodiments.

FIG. 8 is a block diagram of an exemplary network node, such as radio access node 120, in accordance with certain embodiments. Radio access node 120 may include one or more of a transceiver 122, processing circuitry 124 (e.g., comprising one or more processors), memory 126, and network interface 128. In some embodiments, transceiver 122 facilitates transmitting wireless signals to and receiving wireless signals from wireless device 110 (e.g., via an antenna), processing circuitry 124 executes instructions to provide some or all of the functionality described herein as being provided by a radio access node 120, memory 126 stores the instructions executed by processing circuitry 124, and network interface 128 communicates signals to backend network components, such as a gateway, switch, router, Internet, Public Switched Telephone Network (PSTN), core network nodes or radio network controllers, etc.

Processing circuitry 124 may include any suitable combination of hardware and software implemented in one or more modules to execute instructions and manipulate data to perform some or all of the described functions of radio access node 120, such as the functions of communicating a narrowband reference signal, one or more rules, and/or one or more offsets (e.g., $P_{CE[X],Offset}$) that wireless device 110 may use to select an NPRACH CE level. In some embodiments, processing circuitry 124 may include, for example, one or more computers, one or more central processing units (CPUs), one or more microprocessors, one or more applications, and/or other logic. In certain embodiments, processing circuitry 124 may comprise one or more of the modules discussed with respect to FIG. 8.

Memory 126 is generally operable to store instructions, such as a computer program, software, an application including one or more of logic, rules, algorithms, code, tables, etc. and/or other instructions capable of being executed by a processor. Examples of memory 126 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 128 is communicatively coupled to processing circuitry 124, and network interface 128 may refer to any suitable device operable to receive input for radio access node 120, send output from radio access node 120, perform suitable processing of the input or output or both, communicate to other devices, or any combination of the preceding. Network interface 128 may include appropriate hardware (e.g., port, modem, network interface card, etc.) and software, including protocol conversion and data processing capabilities, to communicate through a network.

Other embodiments of radio access node 120 may include additional components beyond those shown in FIG. 8 that may be responsible for providing certain aspects of the radio access node 120's functionality, including any of the functionality described herein and/or any additional functionality (including any functionality necessary to support the solutions described herein). Core network node 130 may comprise similar components as those shown in FIG. 8, however, a wireless interface (e.g., transceiver 122) is optional for the core network node 130. The various different types of network nodes may include components having the same physical hardware but configured (e.g., via programming) to support different radio access technologies, or may represent partly or entirely different physical components.

Figure 9:
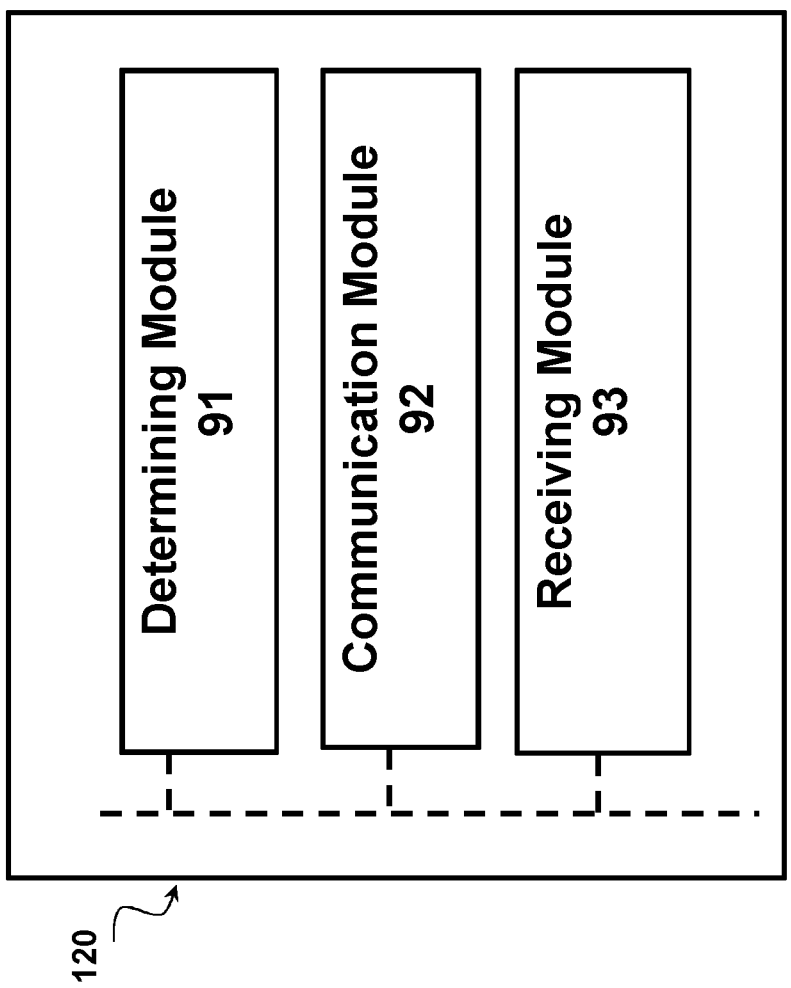
FIG. 9 is a block diagram illustrating an example of modules of a network node, in accordance with certain embodiments.

FIG. 9 illustrates examples of modules that can be included in radio access node 120. In certain embodiments, radio access node 120 may include any one or more of determining module(s) 91, communication module(s) 92, receiving module(s) 93, and/or other suitable modules. The functionality of the modules may be integrated in a single component or separated among several components in any suitable manner. In certain embodiments, one or more of the modules may be implemented using processing circuitry 124 described with respect to FIG. 8.

The determining module 91 may perform the processing functions of radio access node 120 (including any of the radio access node functionality to support the above-described embodiments). As one example, the determining module 91 may determine one or more offsets (e.g., $P_{CE[X],Offset}$) to communicate to a wireless device. More generally, the determining module 91 may perform some or all of the processing functions that FIGS. 4A, 4B, 11A, 11B, 12A, 12B, 13A, 13B, 16, and/or the other examples described herein as being performed by a network node (such as an eNB, radio access node 120, etc.).

The determining module 91 may include analog and/or digital circuitry configured to perform any of the functions of the determining module 91 and/or processing circuitry 124 described above. The functions of the determining module 91 described above may, in certain embodiments, be performed in one or more distinct modules.

The communication module 92 may perform the transmission functions of radio access node 120. As one example, the communication module 92 may transmit to wireless device 110 a narrowband reference signal, one or more rules, and/or one or more offsets (e.g., $P_{CE[X],Offset}$) that the wireless device uses to select an NPRACH CE level. The communication module 92 may include a transmitter and/or a transceiver, such as transceiver 122 described above in relation to FIG. 8. As another example, the communication module 92 may send information to other radio access nodes 120. The communication module 92 may include a network interface, such as interface 128 described above in relation to FIG. 8. The communication module 92 may include circuitry configured to transmit wireless and/or wired messages and/or signals. In particular embodiments, the communication module 92 may receive messages and/or signals for transmission from the determining module 91. In certain embodiments, the functions of the communication module 92 described above may be performed in one or more distinct modules.

The receiving module 93 may perform the receiving functions of radio access node 120. For example, the receiving module 93 may receive an NPRACH preamble that wireless device 10 has sent according to the selected NPRACH CE level. The receiving module 93 may include a receiver and/or a transceiver, such as transceiver 122 described above in relation to FIG. 8. As another example, the receiving module 93 may receive information from other radio access nodes 120. The receiving module 93 may include a network interface, such as interface 128 described in relation to FIG. 8. The receiving module 93 may include circuitry configured to receive wireless and/or wired messages and/or signals. In certain embodiments, the receiving module 93 may include circuitry configured to receive information from memory 124 of radio access node 120. In particular embodiments, the receiving module 93 may communicate received messages and/or signals to the determining module 91. The functions of the receiving module 93 described above may, in certain embodiments, be performed in one or more distinct modules.

In certain embodiments, some or all of the modules shown in FIG. 9 can be combined with one or more modules shown in FIG. 8. As just one example, certain embodiments may combine at least some of the functionality of the processing circuitry (FIG. 8) with the determining module 91 (FIG. 9).

FIGS. 10-16 illustrate additional examples of methods that may be used for reselection of CE levels. Certain embodiments may include fewer or additional steps. The steps of the methods may be performed in any suitable order. As one example, in FIGS. 10A and 10B, certain embodiments perform step B before step A. Additionally, for purposes of example and explanation, certain embodiments herein have been described with reference to NB-IoT. The examples are non-limiting, and other systems could be used. As an example, references to NRSRP can be generalized to any suitable received power, such as RSRP in LTE. Similarly, references to NPRACH can be generalized to any suitable random access channel, such as PRACH in LTE. FIGS. 10A, 11A, 12A, and 13A illustrate generalized examples, and FIGS. 10B, 11B, 12B, and 13B illustrate examples of NB-IoT implementations.

Figure 10A:
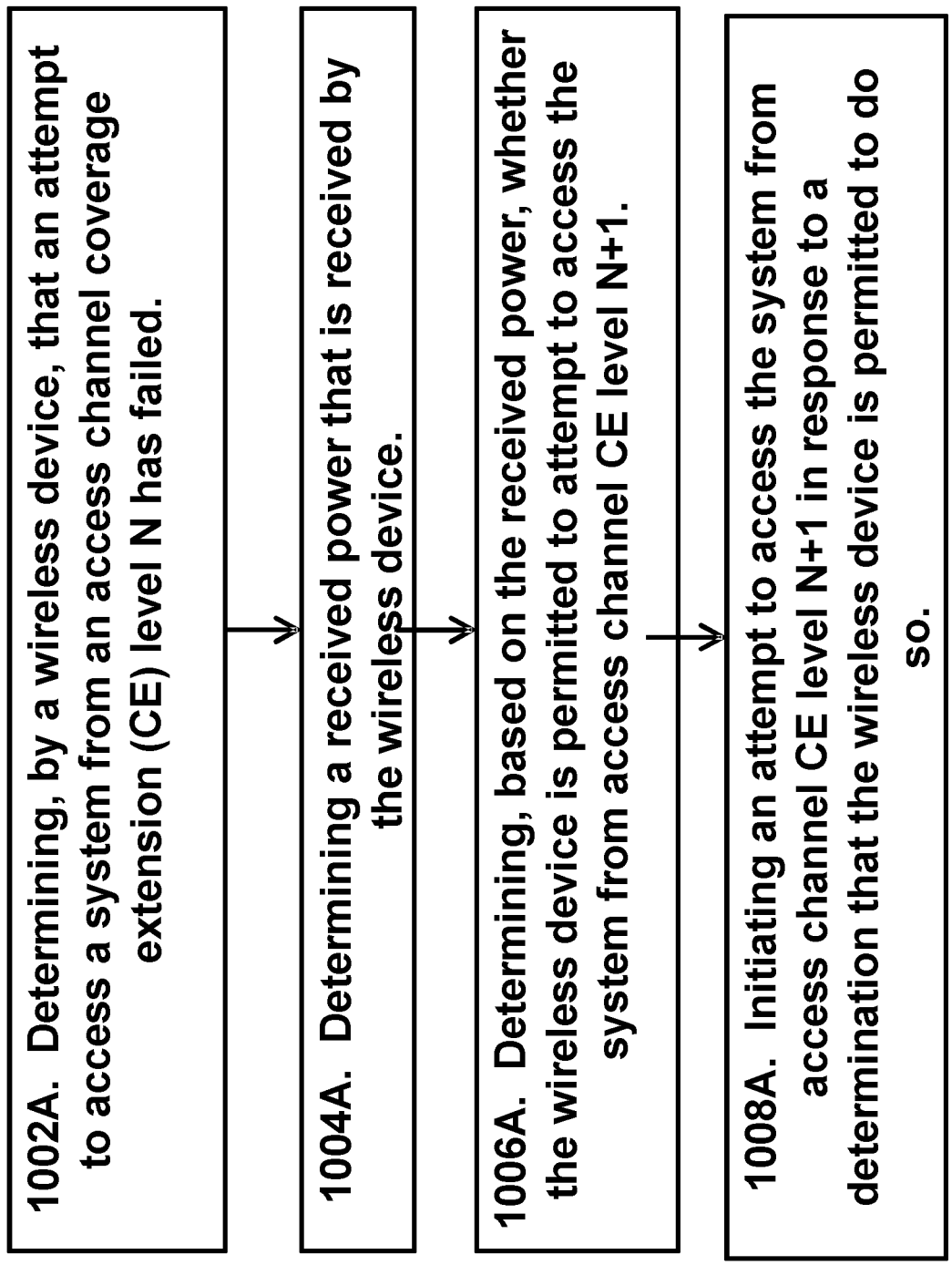

FIG. 10A illustrates an example of a method for use in a wireless device (e.g., wireless device 110), according to certain embodiments. At step 1002A, the method determines that an attempt to access a system from an access channel coverage extension (CE) level N has failed. For example, a failure can occur if a random access response is not received from the network and/or a serving node e.g. within a pre-determined amount of time of sending a pre-determined number of access channel preambles to the network. At step 1004A, the method determines a received power that is received by the wireless device. For example, the wireless device can measure a reference signal received from the network node to determine the received power. At step 1006A, the method determines, based on the received power, whether the wireless device is permitted to attempt to access the system from access channel CE level N+1. FIGS. 12-13 illustrate examples of making such a determination based on comparing the determined received power to a threshold and an associated offset, e.g., $P_{CE[X],Offset}$. At step 1008A, the method initiates an attempt to access the system from access channel CE level N+1 in response to a determination that the wireless device is permitted to do so.

According to some exemplary embodiments a CE level is associated with a number of repetitions for example the number of repetitions of random access preamble. A CE level of N may correspond to a first number of repetitions, while a CE level of N+1 may correspond to a second number of repetition where the second number is higher than the first number.

Figure 10B:
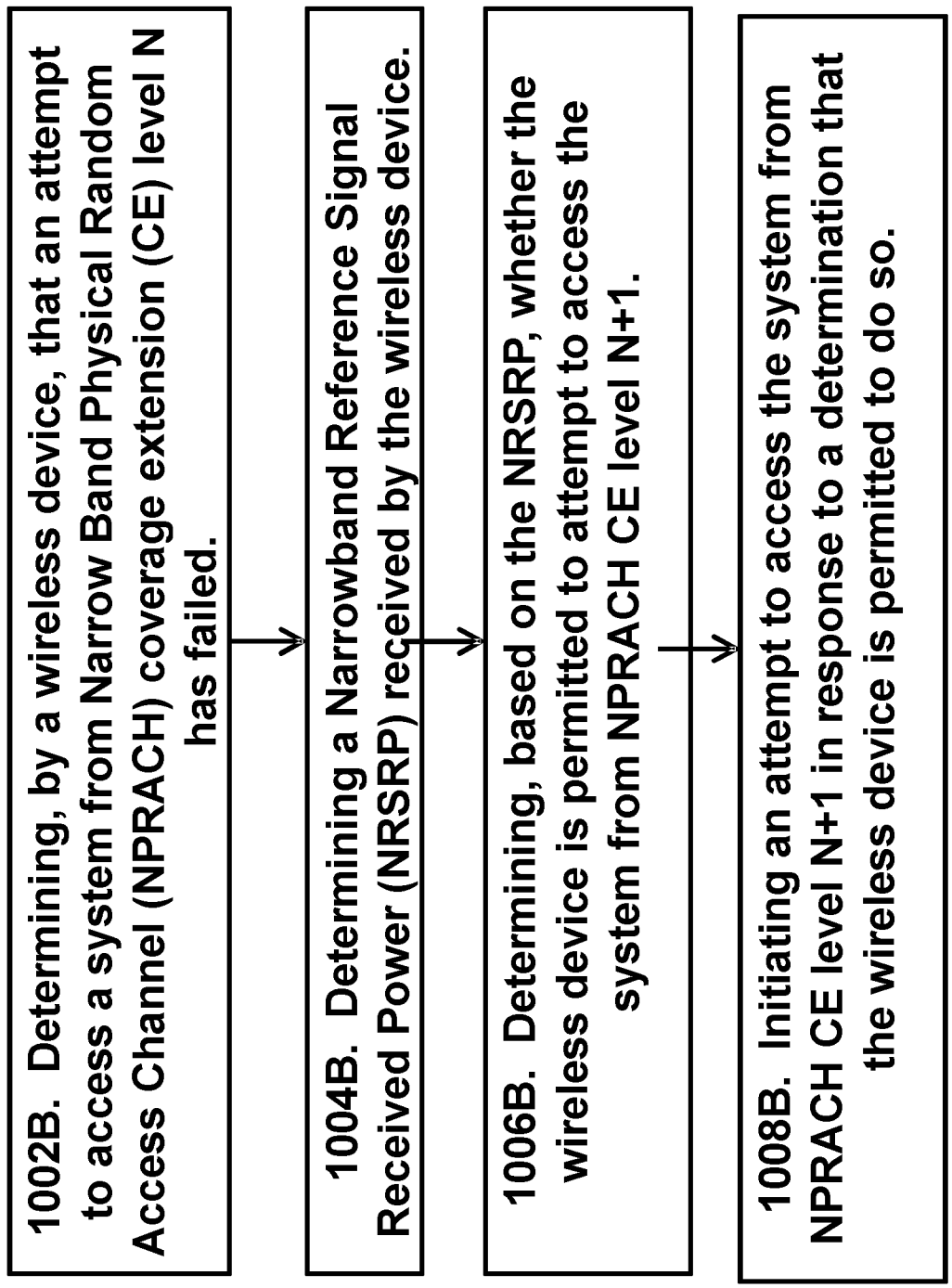

FIG. 10B illustrates an example of a method for use in a wireless device (e.g., wireless device 110), according to certain embodiments. At step 1002B, the method determines that an attempt to access a system from Narrow Band Physical Random Access Channel (NPRACH) coverage extension (CE) level N has failed. For example, a failure can occur if a random access response is not received from the network and/or a serving node e.g. within a pre-determined amount of time of sending a pre-determined number of NPRACH preambles to the network. At step 1004B, the method determines a Narrowband Reference Signal Received Power (NRSRP) received by the wireless device. For example, the wireless device can measure a narrowband reference signal received from the network node to determine the NRSRP. At step 1006B, the method determines, based on the NRSRP, whether the wireless device is permitted to attempt to access the system from NPRACH CE level N+1. FIGS. 12-13 illustrate examples of making such a determination based on comparing the determined NRSRP to an NRSRP threshold and an associated offset, e.g., $P_{CE[X],Offset}$. At step 1008B, the method initiates an attempt to access the system from NPRACH CE level N+1 in response to a determination that the wireless device is permitted to do so.

FIG. 11A illustrates an example of a method for use in a network node (e.g., network node 120), according to certain embodiments. At step 1102A, the method determines one or more offsets, e.g., $P_{CE[X],Offset}$. The one or more offsets indicate whether a wireless device is permitted to attempt to access the system from access channel CE level N+1 after failing an access attempt from access channel CE level N. The one or more offsets may be determined in any suitable manner. As examples, in certain embodiments, the offset(s) may be determined based on a parameter setting, based on information received from another node, or a based on the application of a rule. The method communicates the one or more offsets to the wireless device in step 1104A. The method may optionally include steps 1106A and 1108A in which the network node receives an access attempt from the wireless device and communicates an access response (e.g., RAR message) to the wireless device.

FIG. 11B illustrates an example of a method for use in a network node (e.g., network node 120), according to certain embodiments. At step 1102B, the method determines one or more offsets, e.g., $P_{CE[X],Offset}$. The one or more offsets indicate whether a wireless device is permitted to attempt to access the system from NPRACH CE level N+1 after failing an access attempt from NPRACH CE level N. The one or more offsets may be determined in any suitable manner. As examples, in certain embodiments, the offset(s) may be determined based on a parameter setting, based on information received from another node, or a based on the application of a rule. The method communicates the one or more offsets to the wireless device in step 1104B. The method may optionally include steps 1106B and 1108B in which the network node receives an access attempt from the wireless device and communicates an access response (e.g., RAR message) to the wireless device.

Figure 12A:
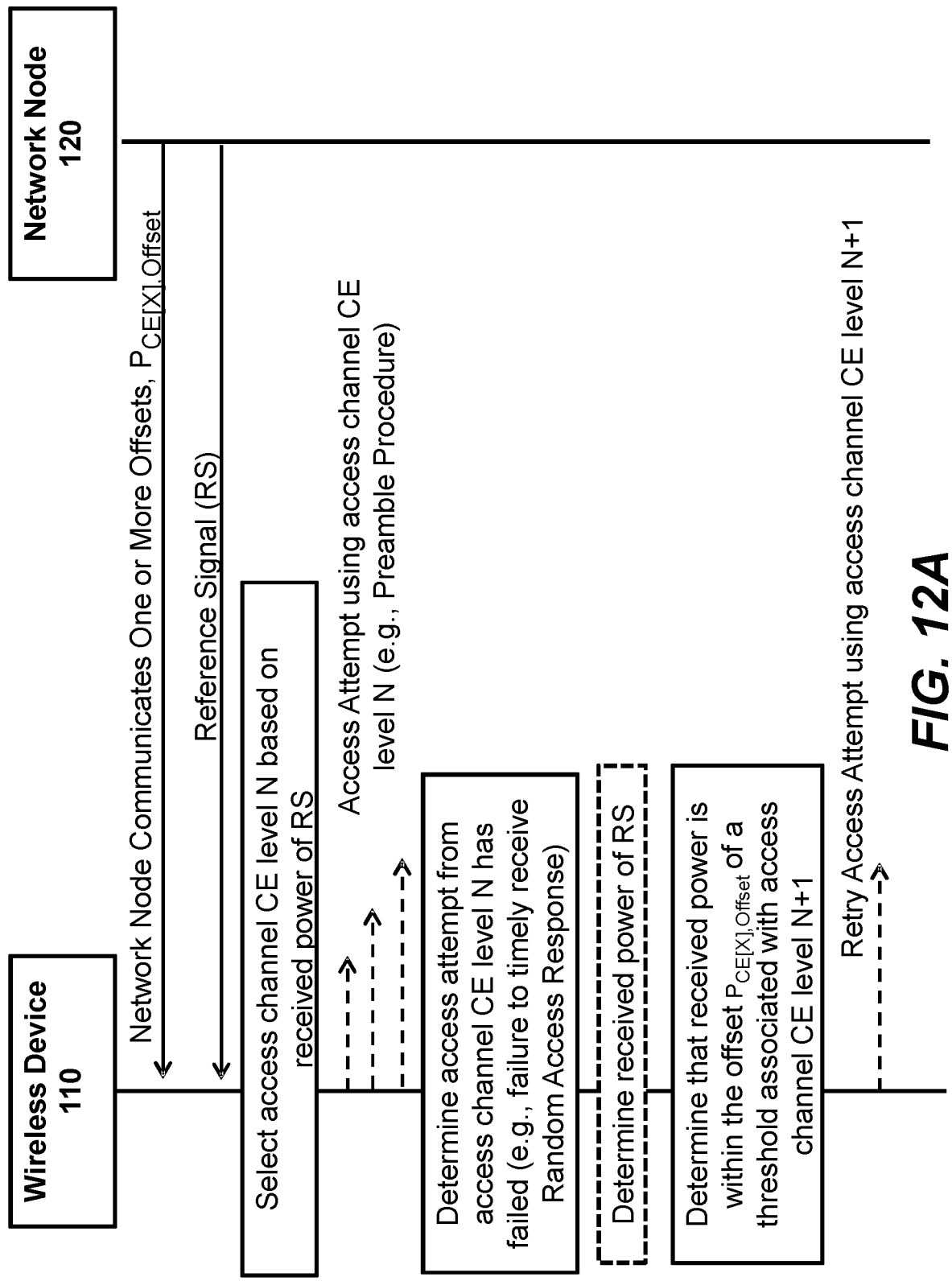
Figure 12B:
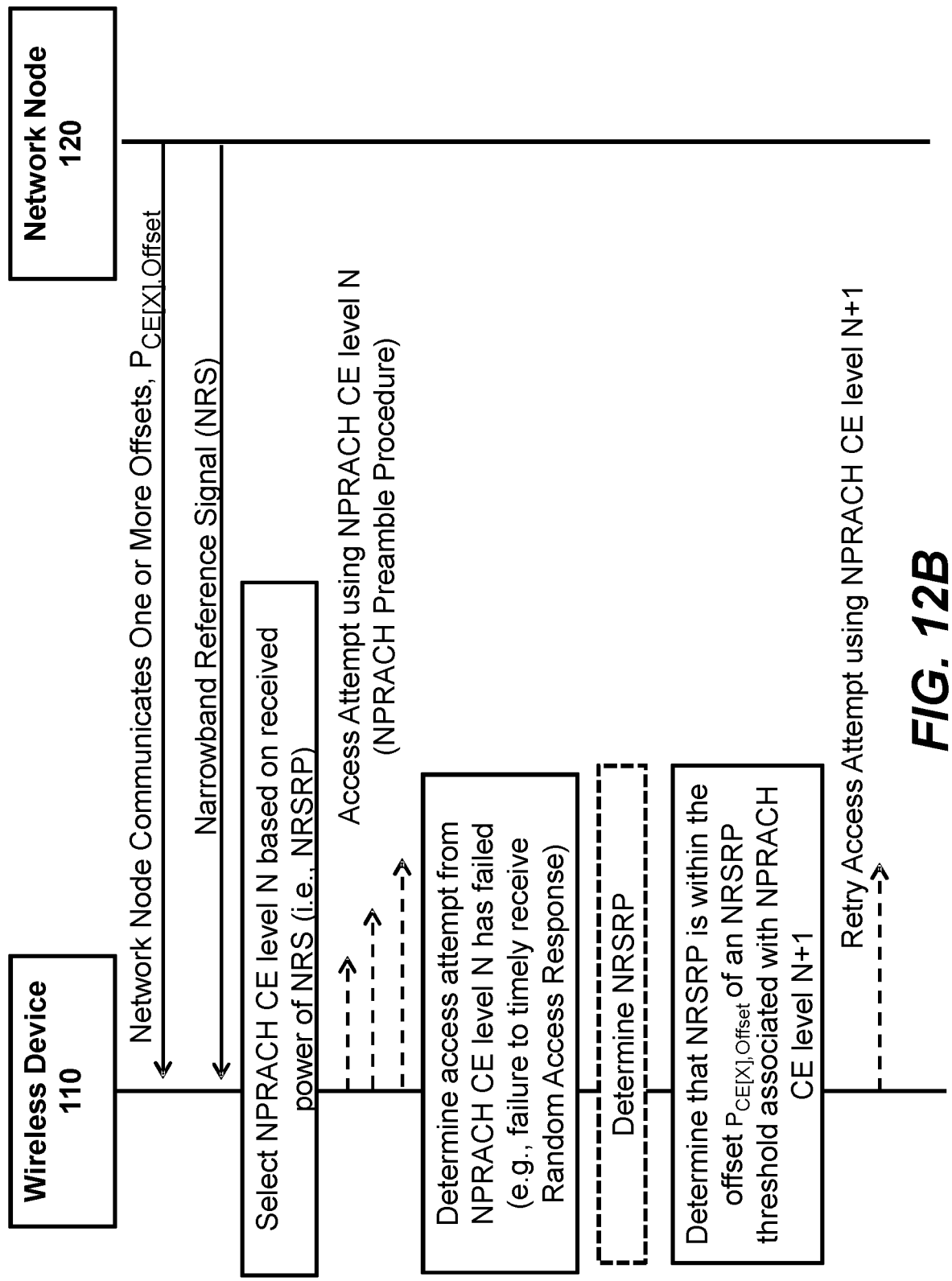
Figure 13A:
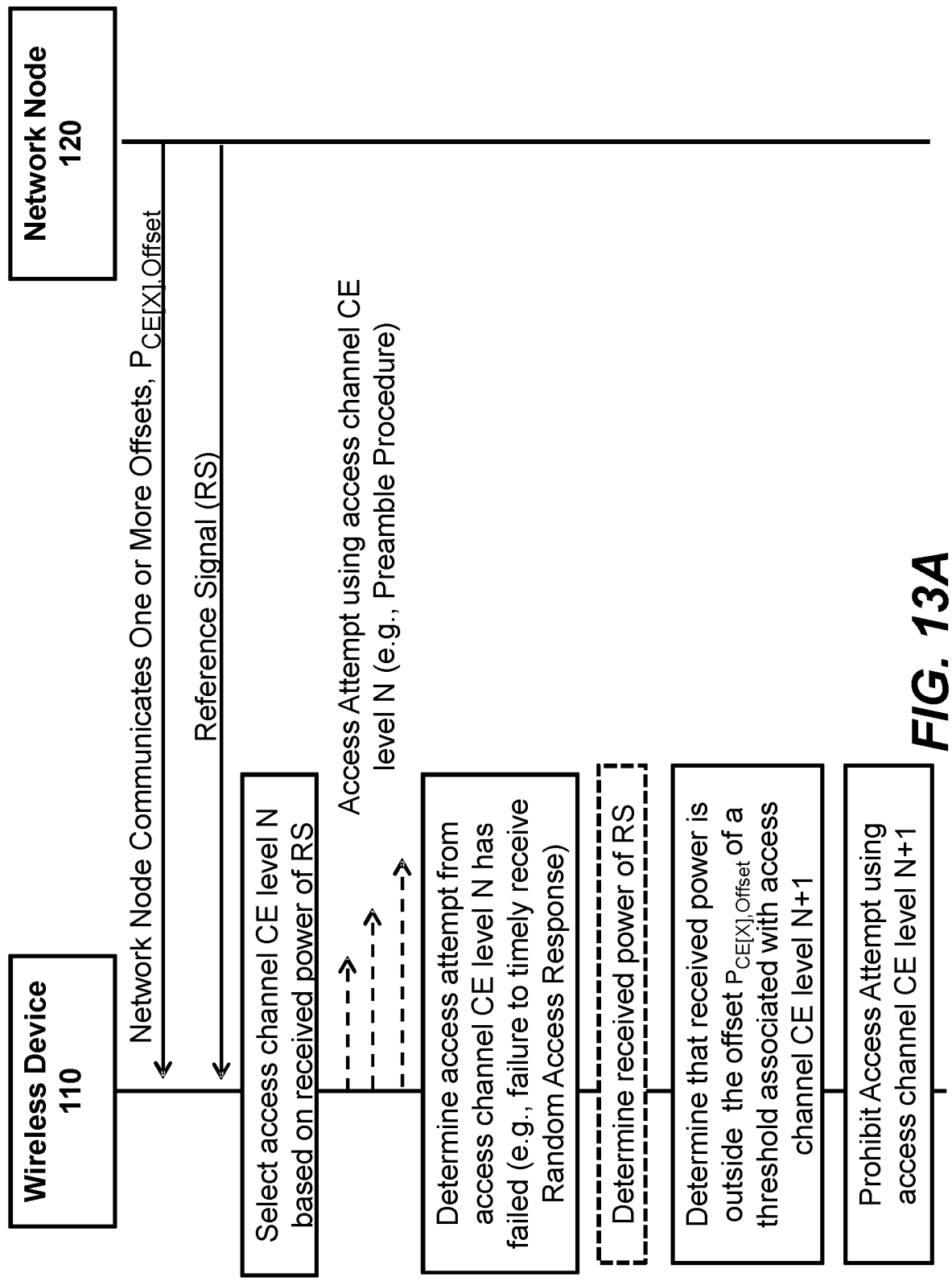

FIGS. 12A-13A illustrate examples of signal flows between a wireless device 110 and a network node 120, according to certain embodiments. The network node communicates one or more offsets, e.g., $P_{CE[X],Offset}$, to the wireless device (see e.g., steps 1102A and 1104A of FIG. 11A). The network node may also communicate a reference signal that the wireless device periodically measures to determine the received power. The wireless device selects an initial access channel CE level N based on the received power. The wireless device performs an access attempt using access channel CE level N. For example, the wireless device may attempt to send a preamble a pre-determined number of times (such as 10 times). If the wireless device does not timely receive a random access response, the wireless device determines that the access attempt has failed. The wireless device then determines if its received power is within the offset (e.g., $P_{CE[X],Offset}$) of a threshold associated with access channel CE level N+1. An example of this determination was described above with respect to FIG. 4A and FIG. 4B. In the example of FIG. 12A, the received power is within the offset of the threshold associated with access channel CE level N+1, so the wireless device is allowed to perform the access attempt using access channel CE level N+1. In the example of FIG. 13A, the received power is outside the offset of the threshold associated with access channel CE level N+1, so the wireless device may be prohibited from performing the access attempt using access channel CE level N+1.

Figure 1:
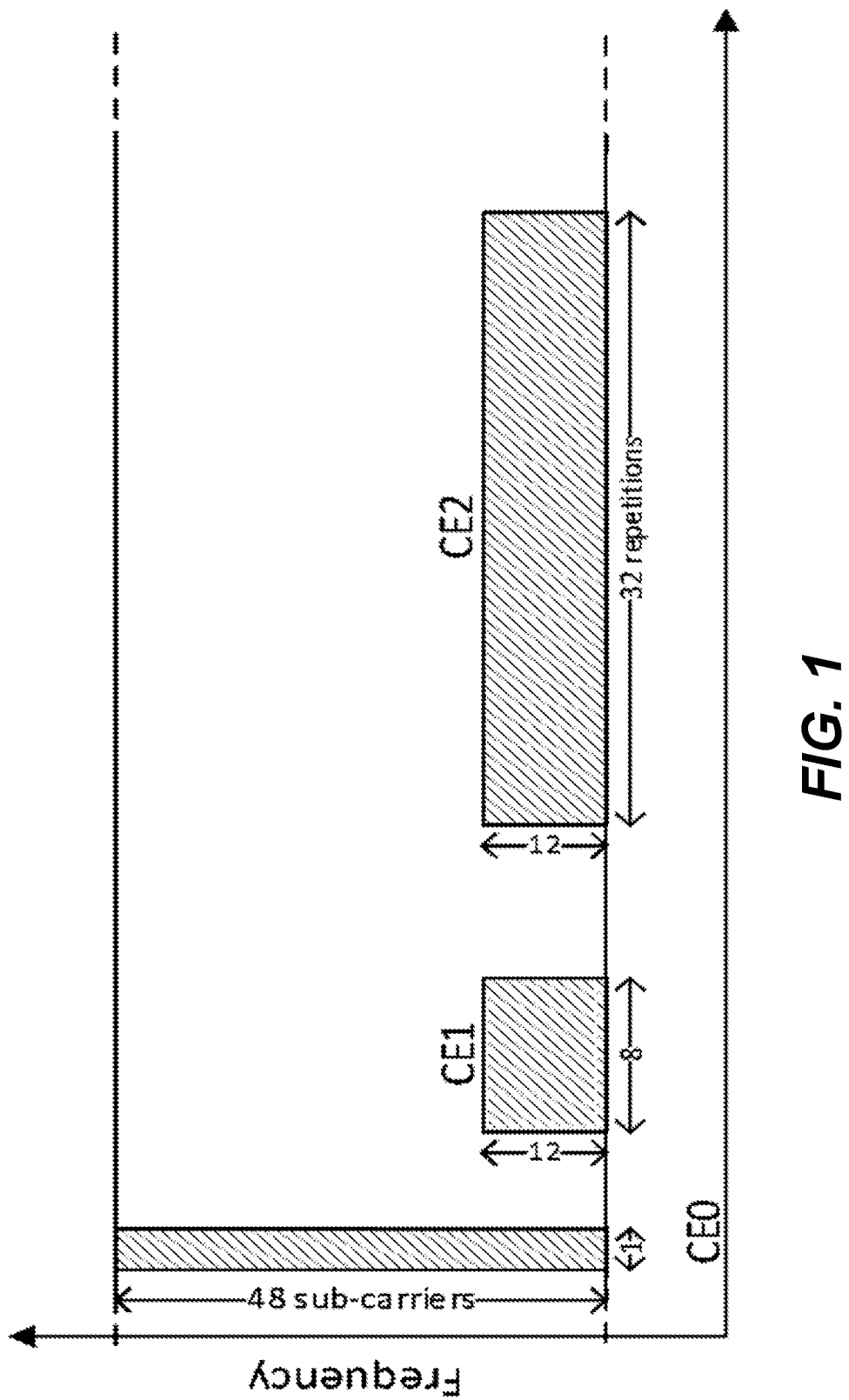
FIG. 1 illustrates an example of NPRACH configurations for coverage extension levels CE0, CE1, and CE2.
Figure 2:
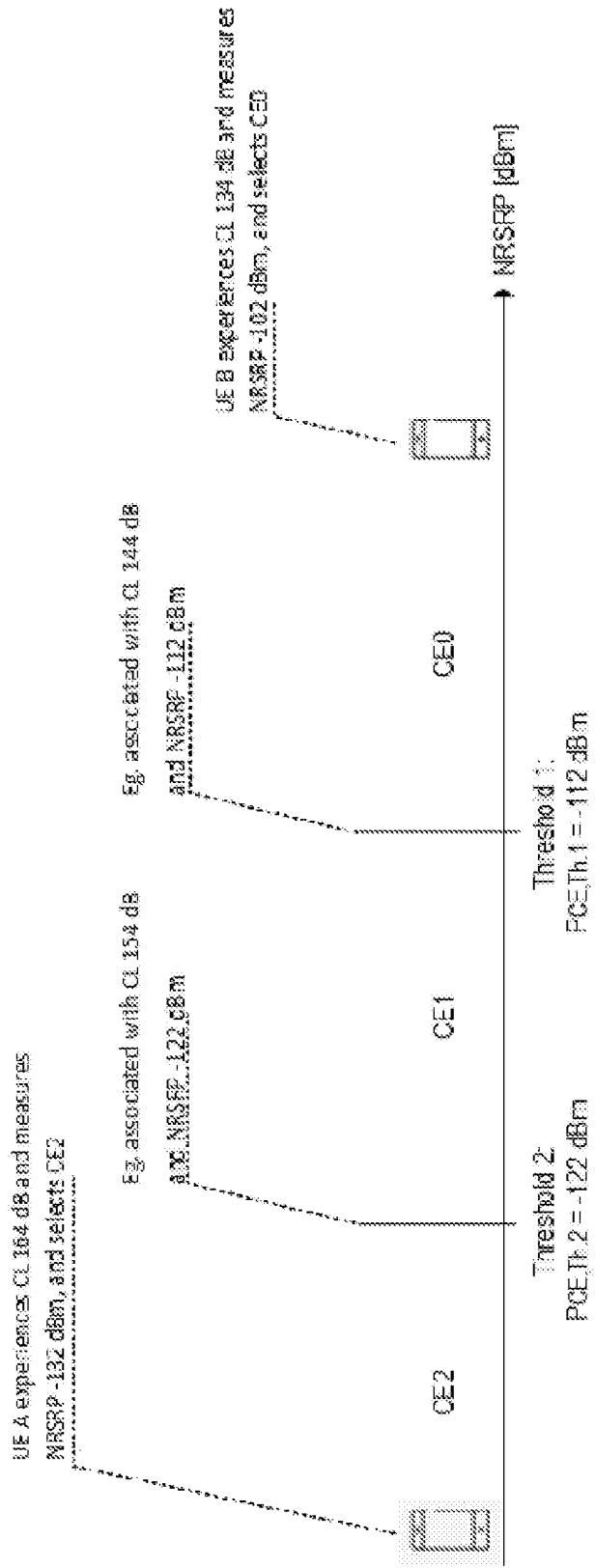
FIG. 2 illustrates examples of thresholds for NPRACH coverage extension levels.
Figure 3:
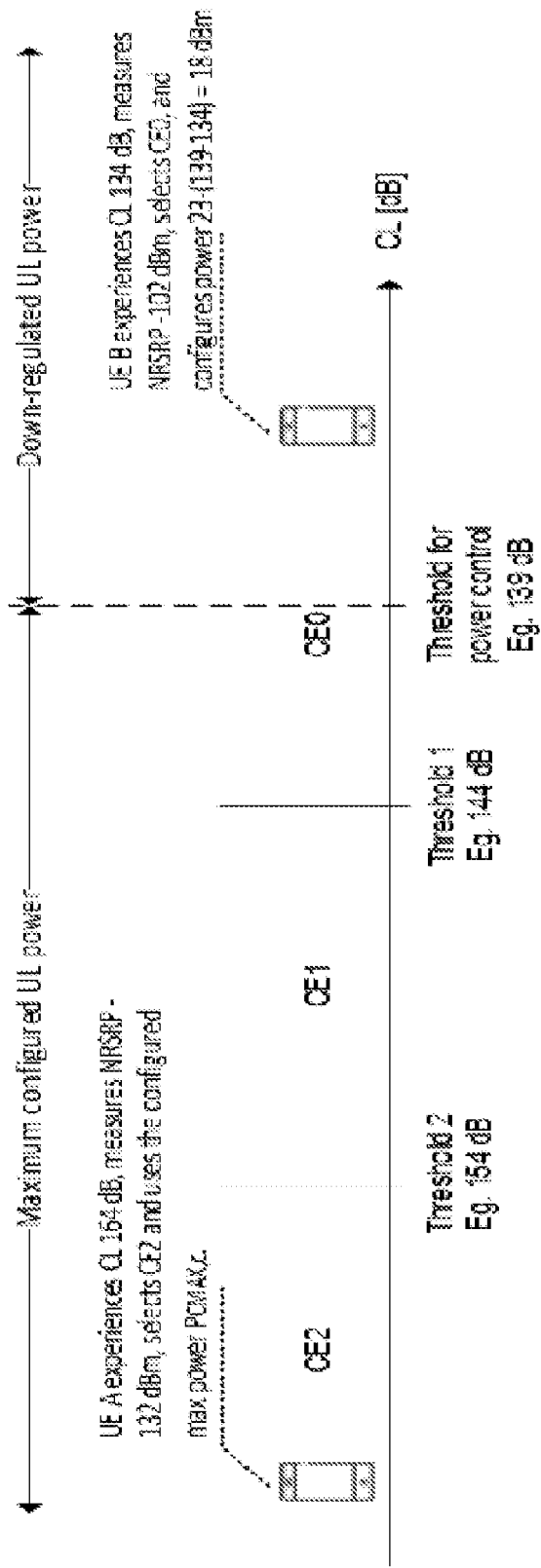
FIG. 3 illustrates an example of NPRACH CE level selection and UL open loop power control.
Figure 13B:
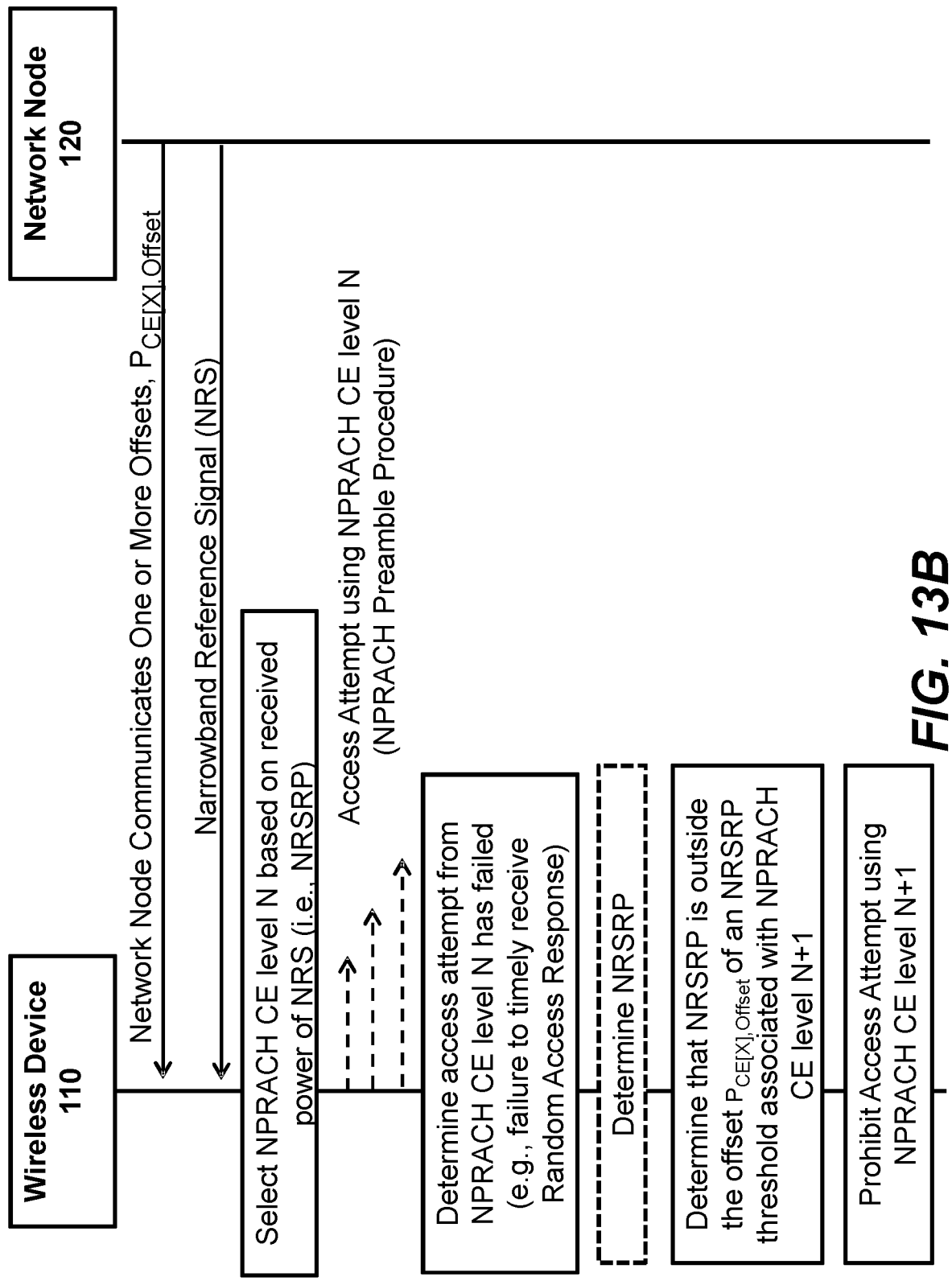

FIGS. 12B-13B illustrate examples of signal flows between a wireless device 110 and a network node 120, according to certain embodiments. The network node communicates one or more offsets, $P_{CE[X],Offset}$, to the wireless device (see e.g., 1102B and 1104B of FIG. 11B). The network node may also communicate a narrowband reference signal that the wireless device periodically measures to determine the received power (NRSRP). The wireless device selects an initial NPRACH CE level N based on the NRSRP (see e.g., FIG. 2, wherein the wireless device compares its measured NRSRP to a threshold to select the initial NPRACH CE level). The wireless device performs an access attempt using NPRACH CE level N. For example, the wireless device may attempt to send a NPRACH preamble a pre-determined number of times (such as 10 times). If the wireless device does not timely receive a random access response, the wireless device determines that the access attempt has failed. The wireless device then determines if its NRSRP is within the offset $P_{CE[X],Offset}$ of an NRSRP threshold associated with NPRACH CE level N+1. An example of this determination was described above with respect to FIG. 4A and FIG. 4B. In the example of FIG. 12B, the NRSRP is within the offset of the NRSRP threshold associated with NPRACH CE level N+1, so the wireless device is allowed to perform the access attempt using NPRACH CE level N+1. In the example of FIG. 13B, the NRSRP is outside the offset of the NRSRP threshold associated with NPRACH CE level N+1, so the wireless device may be prohibited from performing the access attempt using NPRACH CE level N+1.

Figure 14:
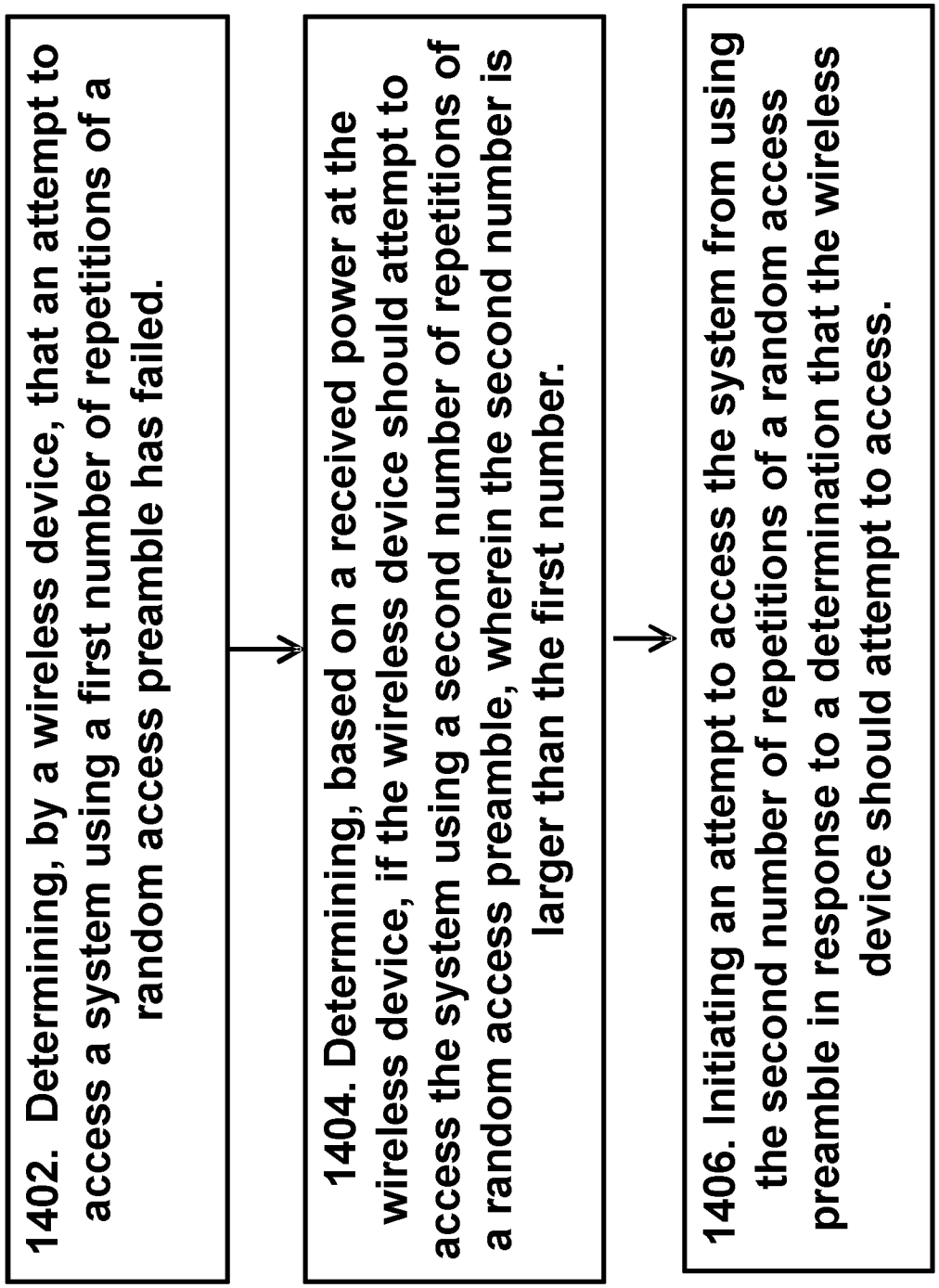

FIG. 14 illustrates an example of a method for use in a wireless device (e.g., wireless device 110), according to certain embodiments. At step 1402, the method determines that an attempt to access a system using a first number of repetitions of a random access preamble has failed. At step 1404, the method determines if the wireless device should attempt to access the system using a second number of repetitions of a random access preamble, wherein the second number is larger than the first number. The first number of repetitions can be any suitable value, such as 0, 1, 2, 3, or other number of repetitions, depending on the embodiment. The determination whether the wireless device should attempt to access the system using the second number of repetitions is based on a received power at the wireless device. For example, in certain embodiments, the received power is a received power of a signal received from the system. At step 1406, in response to a determination in step 1404 that the wireless device should attempt to access, the method initiates an attempt to access the system from using the second number of repetitions of a random access preamble.

Figure 15:
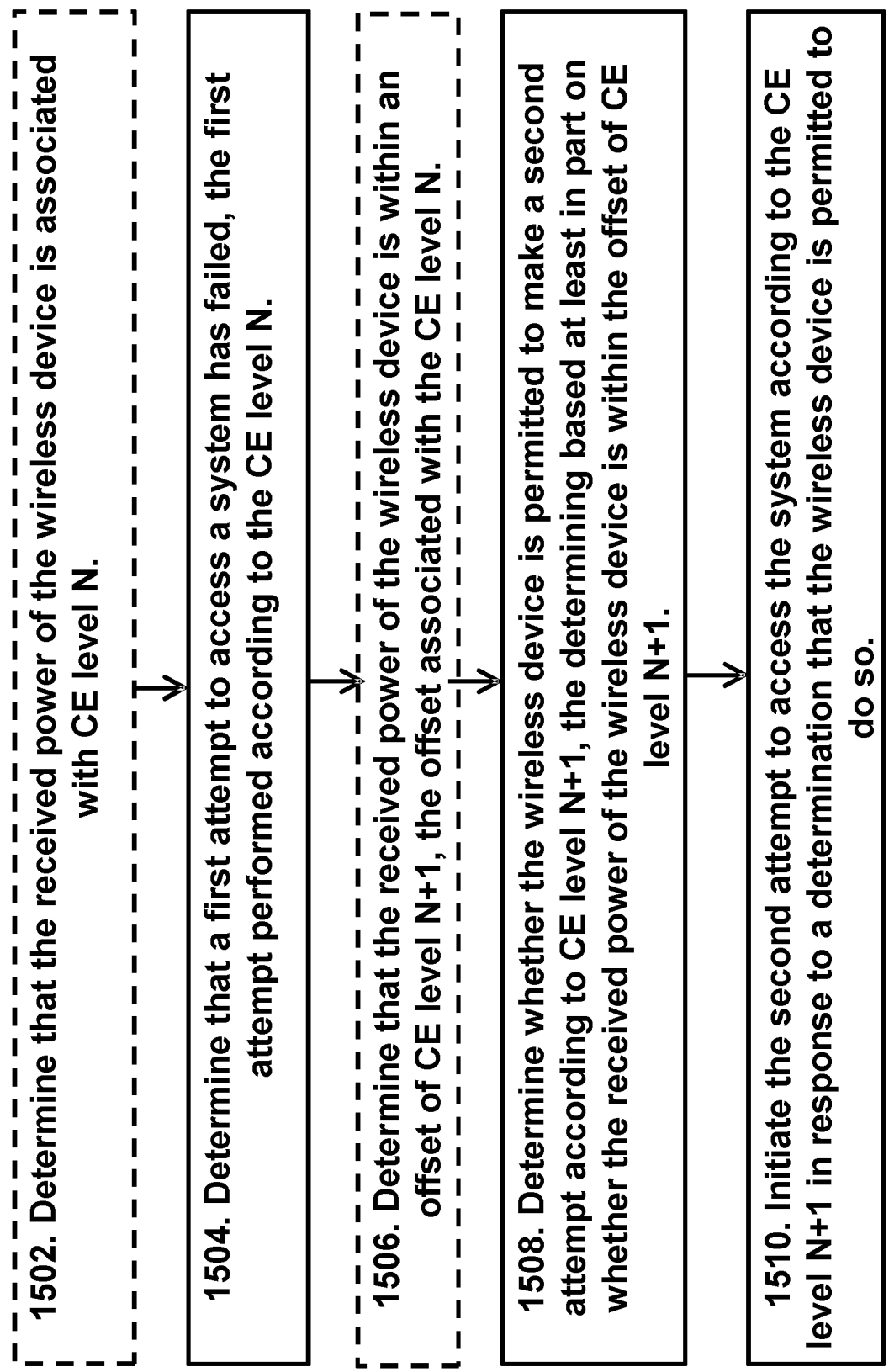

FIG. 15 illustrates an example of a method for use in a wireless device (e.g., wireless device 110), according to certain embodiments. At step 1502, the method determines that the received power of the wireless device is associated with CE level N. For example, in certain embodiments, the method determines that the wireless device is within CE level N if the received power of the wireless device is 1) greater than a first threshold X(N) that corresponds to a minimum received power associated with the CE level N, and 2) less than a second threshold Y(N) that corresponds to a maximum received power associated with the CE level N. Examples are discussed above with respect to FIGS. 4A-4B. Based on determining that the received power of the wireless device is associated with CE level N, the method makes a first attempt to access the system according to CE level N.

At step 1504, the method comprises determining that the first attempt to access the system (i.e., the attempt performed according to CE level N) has failed. The method may determine that the first attempt has failed in response to failing to receive a timely RAR message.

At step 1506, the method comprises determining whether the received power of the wireless device is within an offset of CE level N+1 (wherein the offset is associated with the CE level N). The value of the offset used in this determination may have been received from the network, pre-configured in the wireless device, or obtained in any other suitable manner, depending on the embodiment. FIG. 4B illustrates an example of an offset associated with CE level N, namely offset CE(N). The value of offset CE(N) may be 1 dB, 2 dB, 3 dB, or other suitable value. The value of offset CE(N) can be the same as the value of offsets associated with other CE levels (such as offset CE(N−1) or offset CE(N+1)), or the values of offsets associated with different CE levels can be different. For example, offset CE(N) could be set to 3 dB and offset CE(N+1) could be set to 2 dB.

In certain embodiments, the value of offset CE(N) (when added to threshold X(N)) defines an offset threshold corresponding to a received power that is between threshold X(N) and the second threshold Y(N). In FIG. 4B, region "A" illustrates an example of received power values within an offset of CE level N+1 (wherein the offset is offset CE(N) associated with CE level N). For example, threshold X(N) is shown as defining a boundary between CE level N and CE level N+1, and region "A" illustrates received power values corresponding to threshold X(N) plus the offset CE(N). In step 1506, when the received power of the wireless device is less than the value of X(N) plus offset CE(N) (e.g., when the received power is within region "A" of FIG. 4B), the method determines that the received power is within an offset of CE level N+1 (wherein the offset is offset CE(N) associated with CE level N).

At step 1508, the method comprises determining whether the wireless device is permitted to make a second attempt according to CE level N+1 based at least in part on whether the received power level is within an offset of CE level N+1 (wherein the offset is associated with CE level N), for example, as determined in step 1506. In certain embodiments, the determination in step 1508 is further based on a rule that applies to one or more categories of wireless devices. Examples of categories may include NB-IoT Cat N1 or NB-IoT Cat N2. Other examples may include LTE coverage enhanced Cat M1 or LTE coverage enhanced Cat M2. Thus, certain categories of wireless devices may be permitted to make the second attempt according to CE level N+1 under received power conditions for which other categories of wireless devices might not be permitted to make the second attempt according to CE level N+1.

At step 1510, the method initiates the second attempt to access the system according to the CE level N+1 in response to a determination in step 1508 that the wireless device is permitted to do so. In certain embodiments, CE level N+1 permits a higher number of repetitions for an access attempt than CE level N. In certain embodiments, CE level N+1 permits a higher transmission power than CE level N.

Alternatively, if it had been determined at step 1508 that the received power of the wireless device was within CE level N, but was not within the offset of CE level N+1 associated with CE level N (e.g., if the received power was within region "B" illustrated in FIG. 4B), the method may prohibit the wireless device from making the second access attempt according to the CE level N+1.

Although FIG. 15 has been described with respect to an offset value that separates CE level N into region "A" and region "B," other embodiments may set the offset value to 0 (such that the wireless device does not make access attempts according to CE level N+1 when the attempt to access the system from the CE level N fails) or to a maximum value, such as infinity (such that the wireless device is permitted to attempt to access the system from the CE level N+1 whenever the attempt to access the system from the CE level N fails).

In certain embodiments, the method of FIG. 15 may be implemented in a narrowband method in which the CE level N correspond to a first NPRACH coverage extension level, the CE level N+1 corresponds to a second NPRACH coverage extension level, and the received power comprises an NRSRP of the wireless device.

FIG. 16 illustrates an example of a method for use in a network node (e.g., network node 120), according to certain embodiments. At step 1602, the method determines information related to whether a wireless device is permitted to make a second attempt to access the network node from a coverage extension (CE) level N+1 after failing a first attempt to access the network node from a CE level N. In certain embodiments, a number of repetitions permitted for an access attempt according to CE level N is fewer than a number of repetitions permitted for an access attempt according to CE level N+1. In certain embodiments, a maximum transmission power permitted for an access attempt according to CE level N is less than a maximum transmission power permitted for an access attempt according to CE level N+1. In certain embodiments, the method is implemented in a network node that supports narrowband devices, and the CE level N correspond to a first NPRACH coverage extension level and the CE level N+1 corresponds to a second NPRACH coverage extension level.

At step 1604, the method communicates the information to the wireless device. In certain embodiments, the information is communicated in RRC signaling to the wireless device.

In certain embodiments, the information determined in step 1602 and communicated in step 1604 comprises a rule that allows reselection of the CE level N+1 due to an incorrect choice of the CE level N, while preventing reselection of the CE level N+1 due to high uplink interference level. For example, the rule may permit reselection for wireless devices within an offset of CE level N+1 (e.g., wireless devices which are more likely to have failed due to an incorrect choice of CE level N because they have a received power relatively close to the receive power associated with CE level N+1) and may prevent reselection for wireless devices outside of the offset (e.g., wireless devices which are more likely to have failed due to high uplink interference because they have a relatively good received power relative to CE level N+1).

In certain embodiments, the information comprises a rule indicating one or more categories of wireless devices to which the rule applies. Examples of categories include NB IoT Cat N1, NB IoT Cat N2, LTE coverage enhanced Cat M1, and/or LTE coverage enhanced Cat M2.

In certain embodiments, the information comprises one or more offset values. Each offset value is associated with a respective CE level, examples of which are described with respect to FIGS. 4A-4B. At least one of the offset values is associated with CE level N and enables the wireless device to determine whether a received power of the wireless device is within an offset of CE level N+1 (see e.g., steps 1506-1508 of FIG. 15).

In certain embodiments, the offset value associated with CE level N is greater than zero. For example, the offset value may be configured such that it defines an offset threshold that separates CE level N into regions "A" and "B" described with respect to 4B. As another example, the offset value associated with CE level N is a maximum value indicating that the wireless device is permitted to attempt to access the system from the CE level N+1 whenever the attempt to access the system from the CE level N fails.

In other embodiments, the offset value associated with CE level N can be set to zero if the wireless device within CE level N is never to access the system according to CE level N+1.

In certain embodiments, the information communicated in step 1604 prohibits the wireless device from making the second access attempt according to the CE level N+1 if the received power of the wireless device is within CE level N but not within the offset of CE level N+1, the offset associated with CE level N.

Additional Examples

The following are additional examples of disclosed embodiments. Certain embodiments support reselection of CE levels when reselection is motivated, i.e. due to incorrect choice of CE level, while preventing reselection of CE levels when reselection is not motivated, i.e. due to high UL interference levels. The embodiments may be combined in any suitable manner.

1a. A method for use in a wireless device, the method comprising:
    determining that an attempt to access a system using a first number of repetitions of a random access preamble has failed;
    determining, based on a received power at the wireless device, if the wireless device should attempt to access the system using a second number of repetitions of a random access preamble, wherein the second number is larger than the first number; and
    initiating an attempt to access the system from using the second number of repetitions of a random access preamble in response to a determination that the wireless device should attempt to access.

2a. The method of example embodiment 1a, wherein the first number of repetitions may be zero.

3a. The method of any of example embodiments 1a-2a, wherein the received power at the wireless device, is a received power of a signal received from a serving node.

1b. A method for use in a wireless device, the method comprising:
    using a first set of thresholds for selecting a CE level for a first random access attempt; and
    in response to determining that the first random access attempt has failed, using a second set of thresholds for selecting a CE level for a second random access attempt.

2b. The method of example embodiment 1b, wherein the first set of thresholds and the second set of thresholds are compared/comparable with a received power of the wireless device.

3b(i). The method of any of example embodiments 1b-2b, wherein, for certain received powers, the first set of thresholds and the second set of thresholds are configured such that the CE level selected for the first random access attempt differs from the CE level selected for the second access attempt if the received power level at the wireless device is the same with respect to the first and second random access attempt.
    [E.g., in the example of FIG. 4, if $P_{CE,Th.1}$=−112 dBm and $P_{CE,Offset}$=2 dB and the received power is −111 dBm, CE level 0 could be selected for the first random access attempt and CE level 1 could be selected for the second access attempt.]

3b(ii). The method of example embodiment 3b(i), wherein the received power level at the wireless device is considered to be the same with respect to the first and second random access attempt if the received power level at the time of determining the CE level for the second random access attempt is within a pre-determined margin (e.g., such as ±0.1 dB, ±0.25 dB, ±0.5 dB, ±1 dB or other suitable margin) of the received power level at the time of determining the CE level for the first random access attempt.

3b(iii). The method of example embodiment 3b(i) or 3b(ii), wherein the first set of thresholds and the second set of thresholds are further configured such that, for certain received powers, the CE level selected for the first random access attempt is the same as the CE level selected for the second access attempt.
    [E.g., in the example of FIG. 4, if $P_{CE,Th.1}$=−112 dBm and $P_{CE,Offset}$=2 dB and the received power is −100 dBm, CE level 0 could be selected for both the first random access attempt and the second access attempt.]

4b. The method of any of example embodiments 1b-3b, wherein the received power of the wireless device comprises a Narrowband Reference Signal Received Power (NRSRP).

5b. The method of any of example embodiments 1b-4b, wherein the first set of thresholds comprises one or more thresholds and the second set of thresholds comprises one or more thresholds.

5b(i) wherein at least one threshold of the second set is different from the thresholds of the first set.

6b. The method of any of example embodiments 1b-5b, wherein the first set of thresholds comprises a first received power threshold and the second set of thresholds comprises the first received power threshold and an associated offset.

7b. The method of any of example embodiments 1b-5b, wherein the first set of 55 thresholds associate a CE level (N) with a received power of the wireless device and the second set of thresholds associate the CE level (N) with a different received power of the wireless device.

8b. The method of any of example embodiments 1b-5b, wherein the first set of thresholds associate a CE level (N) with a received power of the wireless device and the second set of thresholds associate a different CE level (N+1) with the same received power of the wireless device.

9b. The method of any of example embodiments 1b-5b, wherein the first set of thresholds comprises a first received power threshold associated with a first CE level (N) and a second received power threshold associated with a second CE level (N+1).

10b. The method of any of example embodiment 9b, wherein the second set of thresholds comprises:
    the first received power threshold and an offset associated with the first CE level (N); and
    the second received power threshold and an offset associated with the second CE level (N+1).

1c. A method for use in a wireless device, the method comprising:
    determining a reference signal received power (RSRP) of the wireless device;
    determining a first CE level for a first random access attempt, the first CE level determined based on comparing the RSRP to a first set of thresholds;
    initiating the first random access attempt according to the first CE level;
    determining that the first random access attempt has failed;
    determining a second CE level for a second random access attempt, the second CE level determined based on comparing a RSRP to a second set of thresholds; and
    initiating the second random access attempt according to the second CE level.

2c. The method of example embodiment 1c, wherein the second CE level is determined to be the same as the first CE level.

3c. The method of example embodiment 1c, wherein the second CE level is determined to different than the first CE level.

4c. The method of any of example embodiments 1c-3c, wherein the determining the second CE level based on comparing the RSRP to a second set of thresholds is performed in response to determining that the RSRP is currently the same as it was at the time of determining the first CE level.

5c. The method of example embodiment 4c, wherein the RSRP is considered to be currently the same as it was at the time of determining the first CE level if the RSRP is within a pre-determined margin (e.g., such as ±0.1 dB, ±0.25 dB, ±0.5 dB, ±1 dB or other suitable margin) of the RSRP at the time of determining the first CE level.

6c. The method of any of example embodiments 1c-5c, wherein the determining the second CE level based on comparing the RSRP to a second set of thresholds occurs after performing a pre-determined number (X) of random access attempts in the first CE level. [E.g., based on a re-attempt counter].

1d. A method for use in a wireless device, the method comprising:

determining that an attempt to access a system from Narrow Band Physical Random Access Channel (NPRACH) coverage extension (CE) level N has failed;

determining, based on a Narrowband Reference Signal Received Power (NRSRP) of the wireless device, whether the wireless device is permitted to attempt to access the system from NPRACH CE level N+1; and initiating an attempt to access the system from NPRACH CE level N+1 in response to a determination that the wireless device is permitted to do so.

2d. The method of example embodiment 1d, wherein the determining whether the wireless device is permitted to attempt to access the system from NPRACH CE level N+1 is based on a rule that allows selection of NPRACH CE level N+1 due to an incorrect choice of NPRACH CE level N, while preventing reselection of NPRACH CE level N+1 due to high uplink interference level.

3d. The method of any of example embodiments 1d-2d, wherein the determining whether the wireless device is permitted to attempt to access the system from NPRACH CE level N+1 is based on a rule that applies to one or more categories of wireless devices, and wherein the wireless device corresponds to at least one of the categories.

4d. The method of example embodiment 3d, wherein at least one of the categories includes NB-IoT Cat N1, NB-IoT Cat N2, LTE coverage enhanced Cat M1, or LTE coverage enhanced Cat M2.

5d. The method of any of example embodiment 1d-4d, wherein the method determines that the wireless device is permitted to attempt to access the system from NPRACH CE level N+1 based on whether the NRSRP of the wireless device is within an offset of an NRSRP threshold associated with NPRACH CE level N+1.

6d. The method of example embodiment 5d, wherein the value of the offset is greater than 0.

7d. The method of any of example embodiments 5d-6d, wherein the value of the offset is set to a maximum value (e.g., infinity) such that the wireless device is permitted to attempt to access the system from NPRACH CE level N+1 whenever the attempt to access the system from NPRACH CE level N fails.

8d. The method of any of example embodiments 5d-7d, wherein the offset is received in RRC signaling from a network node.

9d. The method of any of example embodiments 5d-8d, wherein the offset is one of a plurality of offsets, each offset associated with a respective NPRACH threshold.

10d. The method of example embodiment 1d, wherein the method prohibits the wireless device from attempting to access the system from NPRACH CE level N+1 in response to a determination that the NRSRP of the wireless device is outside an offset of an NRSRP threshold associated with NPRACH CE level N+1.

11d. A wireless device comprising processing circuitry operable to:

determine that an attempt to access a system from Narrow Band Physical Random Access Channel (NPRACH) coverage extension (CE) level N has failed;

determine, based on a Narrowband Reference Signal Received Power (NRSRP) of the wireless device, whether the wireless device is permitted to attempt to access the system from NPRACH CE level N+1; and initiate an attempt to access the system from NPRACH CE level N+1 in response to a determination that the wireless device is permitted to do so.

12d. A wireless device comprising processing circuitry operable to perform any of the methods of example embodiments 1a-3a, 1b-10b, 1c-6c, and/or 1d-10d.

13d. A computer program product comprising a non-transitory computer readable medium storing computer readable program code, the computer readable program code comprises:

program code for determining that an attempt to access a system from Narrow Band Physical Random Access Channel (NPRACH) coverage extension (CE) level N has failed;

program code for determining, based on a Narrowband Reference Signal Received Power (NRSRP) of the wireless device, whether the wireless device is permitted to attempt to access the system from NPRACH CE level N+1; and program code for initiating an attempt to access the system from NPRACH CE level N+1 in response to a determination that the wireless device is permitted to do so.

14d. A computer program product comprising a non-transitory computer readable medium storing computer readable program code, the computer readable program code comprises program code for performing any of the methods of example embodiments 1 a-3a, 1b-10b, 1c-6c, and/or 1d-10d.

15d. A method for use in a network node, the method comprising:

determining information related to whether a wireless device is permitted to attempt to access the network node from NPRACH CE level N+1 after failing an access attempt from NPRACH CE level N; and communicating the information to the wireless device.

16d. The method of example embodiment 15d, wherein the information comprises a rule that allows selection of NPRACH CE level N+1 due to an incorrect choice of NPRACH CE level N, while preventing reselection of NPRACH CE level N+1 due to high uplink interference level.

17d. The method of any of example embodiments 15d-16d, wherein the information comprises a rule indicating one or more categories of wireless devices to which the rule applies.

18d. The method of example embodiment 17d, wherein at least one of the categories includes NB-IoT Cat N1, NB-IoT Cat N2, LTE coverage enhanced Cat M1, or LTE coverage enhanced Cat M2.

19d. The method of any of example embodiments 15d-18d, wherein the information comprises one or more offsets, wherein at least one of the one or more offsets is applicable to an NRSRP threshold associated with NPRACH CE level N+1.

20d. The method of example embodiment 19d, wherein the value of at least one of the one or more offsets is greater than 0.

21d. The method of any of example embodiments 19d-20d, wherein the value of at least one of the one or more offsets is set to a maximum value (e.g., infinity).

22d. The method of any of example embodiments 19d-21d, wherein the at least one offset applicable to the NRSRP threshold associated with NPRACH CE level N+1 is set to a maximum value (e.g., infinity) such that the wireless device is permitted to attempt to access the system from NPRACH CE level N+1 whenever the attempt to access the system from NPRACH CE level N fails.

23d. The method of any of example embodiments 15d-22d, wherein the information is communicated in RRC signaling to the wireless device.

24d. The method of any of example embodiments 19d-23d, wherein the one or more offsets comprise a plurality of offsets, each offset associated with a respective NPRACH threshold.

25d. The method of example embodiment 15d, wherein the information prohibits the wireless device from attempting to access the system from NPRACH CE level N+1 in response to a determination that the NRSRP of the wireless device is outside an offset of an NRSRP threshold associated with NPRACH CE level N+1.

26d. A network node comprising processing circuitry operable to:
determine information related to whether a wireless device is permitted to attempt to access the network node from NPRACH CE level N+1 after failing an access attempt from NPRACH CE level N; and
communicate the information to the wireless device.

27d. The network node of example embodiment 26d, further operable to perform any of the methods of example embodiments 15d-25d.

28d. A computer program product comprising a non-transitory computer readable medium storing computer readable program code, the computer readable program code comprises:
program code for determining information related to whether a wireless device is permitted to attempt to access the network node from NPRACH CE level N+1 after failing an access attempt from NPRACH CE level N; and
program code for communicating the information to the wireless device.

29d. The computer program product of example embodiment 28d, further comprising program code for performing any of the methods of example embodiments 15d-25d.

30d. Any of example embodiments 15d-29d, wherein the method/processing circuitry/program code determines the information based on a parameter setting, based on information received from another node, and/or a based on the application of a rule.

For purposes of example and explanation, certain embodiments herein have been described with reference to NB-IoT. The examples are non-limiting, and other systems could be used. As an example, references to NRSRP can be generalized to any suitable received power, such as RSRP in LTE. Similarly, references to NPRACH can be generalized to any suitable random access channel, such as PRACH in LTE.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for use in a wireless device having a received power associated with a coverage extension (CE) level N determined from a plurality of CE levels, the method comprising:
determining that a first attempt to access a system has failed, the first attempt performed according to the CE level N;
determining that the wireless device is permitted to make a second attempt according to CE level N+1, the determining based on a determination that:

$$P_{CE,Th,N} < RSRP < P_{CE,Th,N} + P_{CE,Offset}$$

wherein RSRP corresponds to a received power of the wireless device while operating according to CE level N;
wherein $P_{CE,Th,N}$ corresponds to a boundary between CE level N and CE level N+1, and
wherein $P_{CE,Th,N} + P_{CE,Offset}$ corresponds to a power level within CE level N; and
initiating the second attempt to access the system according to the CE level N+1 in response to the determination that the wireless device is permitted to do so.

2. The method of claim 1, wherein a number of repetitions permitted for an access attempt according to CE level N is fewer than a number of repetitions permitted for an access attempt according to CE level N+1.

3. The method of claim 1, wherein a maximum transmission power permitted for an access attempt according to CE level N is less than a maximum transmission power permitted for an access attempt according to CE level N+1.

4. The method of claim 1, further comprising:
determining that the received power of the wireless device is associated with the CE level N when the received power of the wireless device is:
greater than a first threshold X(N), the first threshold X(N) corresponding to a minimum received power associated with the CE level N; and
less than a second threshold Y(N), the second threshold Y(N) corresponding to a maximum received power associated with the CE level N.

5. The method of claim 4, wherein the first threshold X(N) defines the boundary between CE level N and CE level N+1.

6. The method of claim 4, further comprising:
determining that the received power of the wireless device is within the offset associated with the CE level N when the received power of the wireless device is less than the first threshold X(N) plus the offset associated with the CE level N.

7. The method of claim 1, wherein the method prohibits the wireless device from making the second access attempt according to the CE level N+1 in response to a determination that the received power of the wireless device is within CE level N but not within the offset.

8. A wireless device comprising processing circuitry configured to:
   determine that a first attempt to access a system has failed, the first attempt performed according to a CE level N, the CE level N determined from a plurality of CE levels based on a received power of the wireless device;
   determine that the wireless device is permitted to make a second attempt according to CE level N+1, the determining based on a determination that:

$$P_{CE,Th,N} < RSRP < P_{CE,Th,N} + P_{CE,Offset}$$

wherein RSRP corresponds to a received power of the wireless device while operating according to CE level N;
   wherein $P_{CE,Th,N}$ corresponds to a boundary between CE level N and CE level N+1, and
   wherein $P_{CE,Th,N} + P_{CE,Offset}$ corresponds to a power level within CE level N; and
   initiate the second attempt to access the system according to the CE level N+1 in response to the determination that the wireless device is permitted to do so.

9. A method for use in a network node, the method comprising:
   determining information related to whether a wireless device is permitted to make a second attempt to access the network node from a coverage extension (CE) level N+1 after failing a first attempt to access the network node from a CE level N, wherein the wireless device is permitted to make the second attempt when:

$$P_{CE,Th,N} < RSRP < P_{CE,Th,N} + P_{CE,Offset}$$

wherein RSRP corresponds to a received power of the wireless device while operating according to CE level N;
   wherein $P_{CE,Th,N}$ corresponds to a boundary between CE level N and CE level N+1, and
   wherein $P_{CE,Th,N} + P_{CE,Offset}$ corresponds to a power level within CE level N; and
   communicating the information to the wireless device.

10. The method of claim 9, wherein a number of repetitions permitted for an access attempt according to CE level N is fewer than a number of repetitions permitted for an access attempt according to CE level N+1.

11. The method of claim 9, wherein a maximum transmission power permitted for an access attempt according to CE level N is less than a maximum transmission power permitted for an access attempt according to CE level N+1.

12. The method of claim 9, wherein the information comprises a plurality of offset values, each offset value associated with a respective CE level.

13. A network node comprising processing circuitry, the processing circuitry configured to:
   determine information related to whether a wireless device is permitted to make a second attempt to access the network node from a coverage extension (CE) level N+1 after failing a first attempt to access the network node from a CE level N, wherein the wireless device is permitted to make the second attempt when:

$$P_{CE,Th,N} < RSRP < P_{CE,Th,N} + P_{CE,Offset}$$

wherein RSRP corresponds to a received power of the wireless device while operating according to CE level N;
   wherein $P_{CE,Th,N}$ corresponds to a boundary between CE level N and CE level N+1, and
   wherein $P_{CE,Th,N} + P_{CE,Offset}$ corresponds to a power level within CE level N; and
   communicate the information to the wireless device.

14. The network node of claim 13, the processing circuitry further configured to perform any of the methods of claims 10-13 wherein a number of repetitions permitted for an access attempt according to CE level N is fewer than a number of repetitions permitted for an access attempt according to CE level N+1.

* * * * *